United States Patent
Luo et al.

(10) Patent No.: US 10,979,917 B2
(45) Date of Patent: Apr. 13, 2021

(54) SYSTEMS AND METHODS FOR COMMUNICATION BEAM LOSS RECOVERY

(71) Applicant: QUALCOMM INCORPORATED, San Diego, CA (US)

(72) Inventors: Jianghong Luo, Skillman, NJ (US); Navid Abedini, Somerset, NJ (US); Sundar Subramanian, San Diego, CA (US); Junyi Li, Chester, NJ (US); Bilal Sadiq, Basking Ridge, NJ (US); Muhammad Nazmul Islam, Edison, NJ (US)

(73) Assignee: QUALCOMM Incorporated, San Diego, CA (US)

(*) Notice: Subject to any disclaimer, the term of this patent is extended or adjusted under 35 U.S.C. 154(b) by 14 days.

(21) Appl. No.: 16/056,582

(22) Filed: Aug. 7, 2018

(65) Prior Publication Data
US 2019/0090143 A1 Mar. 21, 2019

Related U.S. Application Data

(60) Provisional application No. 62/559,519, filed on Sep. 16, 2017.

(51) Int. Cl.
*H04W 24/04* (2009.01)
*H04B 7/06* (2006.01)
*H04B 7/08* (2006.01)
*H04W 76/19* (2018.01)
*H04W 16/28* (2009.01)
(Continued)

(52) U.S. Cl.
CPC ............ *H04W 24/04* (2013.01); *H04B 7/022* (2013.01); *H04B 7/063* (2013.01); *H04B 7/0617* (2013.01); *H04B 7/0626* (2013.01); *H04B 7/0695* (2013.01); *H04B 7/088* (2013.01); *H04W 16/28* (2013.01); *H04W 76/19* (2018.02); *H04W 24/10* (2013.01)

(58) Field of Classification Search
CPC ..... H04W 24/04; H04W 16/28; H04W 76/19; H04W 24/10; H04B 7/0626; H04B 7/088; H04B 7/0695; H04B 7/063; H04B 7/0617; H04B 7/022
See application file for complete search history.

(56) References Cited

U.S. PATENT DOCUMENTS 10,257,070 B2 * 4/2019 Zhang .................... H04L 43/16
10,461,994 B2 * 10/2019 Liu ........................ H04L 5/0051
10,499,390 B2 * 12/2019 Wang ...................... H04B 7/06
(Continued)

OTHER PUBLICATIONS

International Search Report and Written Opinion—PCT/US2018/045689—ISA/EPO—dated Jan. 14, 2019.
(Continued)

*Primary Examiner* — Christopher P Grey
(74) *Attorney, Agent, or Firm* — Qualcomm IP Dept.; James Hunt Yancey, Jr.

(57) ABSTRACT

A method for communication includes determining whether any of a plurality of communication control beams have failed, identifying at least one active communication control beam in the plurality of communication control beams, and communicating a partial beam pair link (BPL) loss communication on the at least one active communication control beam.

31 Claims, 17 Drawing Sheets

(51) Int. Cl.
*H04W 24/10* (2009.01)
*H04B 7/022* (2017.01)

(56) References Cited

U.S. PATENT DOCUMENTS

| | | | | |
|---|---|---|---|---|
| 10,524,246 | B2* | 12/2019 | Chou | H04W 72/042 |
| 10,555,307 | B2* | 2/2020 | Liu | H04L 1/00 |
| 10,700,752 | B2* | 6/2020 | Jung | H04W 74/006 |
| 2019/0014570 | A1* | 1/2019 | Nam | H04B 7/0617 |
| 2019/0081689 | A1* | 3/2019 | Yu | H04W 24/04 |
| 2019/0082335 | A1* | 3/2019 | Yu | H04W 76/19 |

OTHER PUBLICATIONS

CATT: "Beam Management," 3GPP Draft; R2-1706396_Beam Management_V5, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017, Jun. 26, 2017 (Jun. 26, 2017), XP051300905, pp. 1-5, Retrieved from the Internet: URL:http://www.3gpp.org/ftp/Meetings_3GPP_SYNC/RAN2/Docs/ [retrieved on Jun. 26, 2017].
LG Electronics: "Views on Beam Recovery," 3GPP Draft; R1-1611819, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051175788, 4 pages, Retrieved from the Internet: URL:http://www.3gpp.org/ftp/Meetings_3GPP_SYNC/RAN1/Docs/ [retrieved on Nov. 13, 2016].
Nokia et al: "On Beam Grouping and Reporting," 3GPP Draft; R1-1716499, 3rd generation partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 11, 2017 (Sep. 11, 2017), XP051329211, 6 pages, Retrieved from the Internet: URL: http://www.3gpp.org/ftp/tsg_ran/WG1_RL1/TSGR1_AH/NR_AH_1709/Docs/ [retrieved on Sep. 11, 2017].
NTT DOCOMO: "Views on Beam Recovery," 3GPP Draft; R1-1716083_Beam_Recovery, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 12, 2017 (Sep. 12, 2017), XP051329742, 10 pages, Retrieved from the Internet: URL:http://www.3gpp.org/ftp/tsg_ran/WG1_RL1/TSGR1_AH/NR_AH_1709/Docs/ [retrieved on—Sep. 12, 2017].
Partial International Search Report—PCT/US2018/045689—ISA/EPO—dated Nov. 14, 2018.
Qualcomm Incorporated: "Beam Recovery Procedure," 3GPP Draft; R1-1716397_Beam Recovery Procedure, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 12, 2017 (Sep. 12, 2017), XP051329986, 8 pages, Retrieved from the Internet: URL:http://www.3gpp.org/ftp/tsg_ran/WG1_RL1/TSGR1_AH/NR_AH_1709/Docs/ [retrieved on—Sep. 12, 2017].

* cited by examiner

SYSTEMS AND METHODS FOR COMMUNICATION BEAM LOSS RECOVERY

RELATED APPLICATIONS

This application claims priority to and the benefit of U.S. Provisional Patent Application No. 62/559,519, entitled "SYSTEMS AND METHODS FOR COMMUNICATION BEAM LOSS RECOVERY," filed Sep. 16, 2017, the contents of which are hereby incorporated herein by reference in its entirety as if fully set forth below and for all applicable purposes.

TECHNICAL FIELD

The technology discussed below relates to wireless communication systems, and more particularly to communication beam loss recovery. Embodiments enable and provide systems and methods for communication beam recovery where fewer than all of the available communication control beams may fail.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). An example of an advancement to LTE technology is referred to as 5G, also sometimes referred to as new radio (NR). The terms 5G and NR represent an advancement of LTE technology including, for example, various advancements to the wireless interface, processing improvements, and the enablement of higher bandwidth to provide additional features and connectivity.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). UEs may locate a base station by detecting synchronization signal(s) from which the UEs acquire the base station identification code (cell ID), system timing information, frame alignment information, etc. In systems where the receiver is highly signal strength and noise limited (e.g., millimeter wave systems), beamformed synchronization signals may be swept across the cell coverage area to provide coverage enhancement to improve detection. In 5G or NR communication systems, multiple communication control beams may be supported to provide a robust system against communication beam failure.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication including determining whether any of a plurality of communication control beams have failed, identifying at least one active communication control beam in the plurality of communication control beams, and communicating a partial beam pair link (BPL) loss communication on the at least one active communication control beam.

Another aspect of the disclosure provides a system for communication including a user equipment (UE) configured to determining whether any of a plurality of communication control beams have failed, the UE configured to identify at least one active communication control beam in the plurality of communication control beams, and the UE configured to communicate a partial beam pair link (BPL) loss communication on the at least one active communication control beam.

Another aspect of the disclosure provides a method for communication including determining whether any of a plurality of communication control beams have failed, identifying at least one active communication control beam in the plurality of communication control beams, and communicating a partial beam pair link (BPL) loss communication when a partial beam pair link (BPL) loss occurs between a first communication device and a first communication node, the partial beam pair link (BPL) loss communication occurring between the first communication device and a second communication node on behalf of the first communication node experiencing the partial beam pair link (BPL) loss with the first communication device.

Another aspect of the disclosure provides a non-transitory computer-readable medium storing computer executable code for communication, the code executable by a processor to determine whether any of a plurality of communication control beams have failed, identify at least one active communication control beam in the plurality of communication control beams, and communicate a partial beam pair link (BPL) loss communication on the at least one active communication control beam.

Another aspect of the disclosure provides a device for communication including means for determining whether any of a plurality of communication control beams have failed, means for identifying at least one active communication control beam in the plurality of communication control beams, and means for communicating a partial beam pair link (BPL) loss communication on the at least one active communication control beam.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
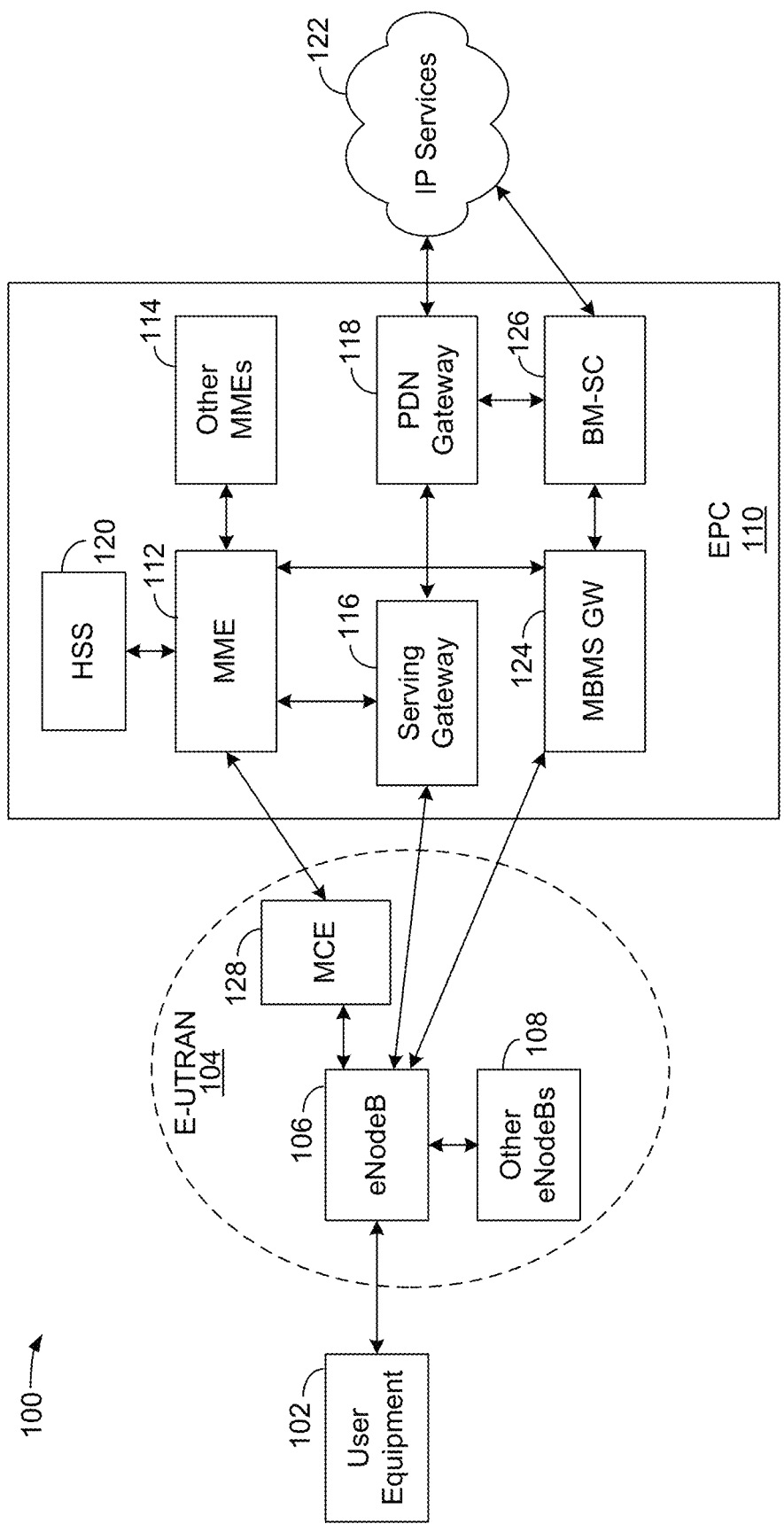
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are directed to beamforming systems generally used in millimeter wave communication systems where it is desirable to provide systems and methods for communication beam recovery where there may be multiple communication control beams, and where fewer than all of the communication control beams may fail. In such methods and systems, where fewer than all of the communication control beams may fail, the failure may be referred to as partial beam pair link (BPL) loss, where a subset of the multiple communication control beams may fail, leaving at least one BPL established between a base station and a UE.

The term "beam management" generally refers to a set of layer 1 (L1) or layer 2 L2) (Open Systems Interconnect 7 Layer Model) procedures to acquire and maintain a transmit receive point (TRP) and/or user equipment (UE) beams that can be used for downlink (DL) and uplink (UL) transmission and reception.

The term "beam determination" refers to a situation where a TRP or a UE select its own transmit and receive communication beam(s).

The term "beam measurement" refers to a situation where a TRP(s) or a UE measures characteristics of received beamformed signals.

The term "beam reporting" generally refers to a UE reporting information of beamformed signal(s) based on beam measurement processes.

The term "beam sweeping" refers to the operation of covering a spatial area, with beams transmitted and/or received during a time interval in a predetermined manner.

As used herein, the term "serving beam" refers to an active communication beam, and/or an active communication BPL between two communication devices.

As used herein, the term "target beam" or "candidate beam" refers to another available communication beam and/or an available communication BPL between two communication devices that may be available for communication.

As used herein, the term radio link failure (RLF) refers to the failure of radio communication on a serving beam between two communication devices.

Both a channel state information-reference signal (CSI-RS) signal and a synchronization signal (SS signal) can be used for beam management (BM).

BM procedures support L1-RSRP (reference signal received power) reporting from CSI-RS and/or SS blocks.

An SS burst set with L blocks is periodically transmitted. Transmission of CSI-RS can be periodic where it is configured by a base station for a UE through a radio resource control (RRC) message during connection setup; or can be aperiodic, where it is scheduled by a base station. Transmission of CSI-RS can also be semi-persistent, where it is configured for a UE through an RRC message during connection setup, and activated/deactivated by a base station.

A UE's beam measurement report (e.g. L1-RSRP report), can be periodic, where it is configured for a UE through an RRC message during connection setup; or aperiodic, where, for 5G or NR, it at least supports base station triggered aperiodic beam reporting.

A UE's beam measurement report (e.g. L1-RSRP report), can be semi-persistent, where it is configured for a UE through an RRC message during connection setup, and activated/deactivated by a base station.

Both CSI-RS and SS can be based on a UE's beam measurement report, where a base station makes decisions to update serving beams.

Currently, at least network triggered aperiodic beam reporting is supported. Aperiodic beam reporting may also be supported under certain conditions.

In LTE, the only L1 request signal is scheduling request (SR) by a physical uplink control channel (PUCCH). An SR may be triggered by a buffer status report (BSR) MAC CE (medium access control-control element) in the MAC layer. A BSR may be triggered due to uplink (UL) data traffic or RRC signaling messages.

For beam failure detection, a UE monitors beam failure detection reference signal (RS) to assess if a beam failure trigger condition has been met For new candidate beam identification, a UE monitors the beam identification RS to find a new candidate beam. Beam identification RS includes periodic CSI-RS for beam management, if it is configured by the network, periodic CSI-RS and SS-blocks within the serving cell, if SS-block is also used in beam management.

For beam failure recovery request transmission, a UE reports new identified candidate TX beam from the physical random access channel (PRACH), a PRACH-like communication (for example, a communication using a different parameter for the preamble sequence from a PRACH communication) or the PUCCH. A UE may monitor the base station's response for beam failure recovery request. A UE may monitor NR-PDCCH (new radio-physical downlink control channel) with demodulation reference signal (DMRS) spatial quasi co-located (QCL'ed) with RS of UE identified candidate beam.

Currently, a UE monitors periodic reference beams that may be quasi-co-located (QCL) to current serving beams and/or serving control channels. If the UE detects beam failure of all possible control beams, the UE then searches for a new candidate beam or beams at the next periodic CSI-RS or SS opportunity. If the UE detects a new candidate beam or beams, the UE then transmits a beam failure recovery request with information on the identified candidate beam or beams to the base station. The UE then monitors the base station for a response to the beam failure recovery request. This process generally is performed when there is a complete beam pair link (BPL) loss or failure and generally requires that a UE await a CSI-RS or SS signal from the base station before beginning its beam recovery procedures, thus delaying any beam recovery procedures for at least one communication period while the UE awaits the CSI-RS or SS from the base station.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS 100 can interconnect with other access networks, but for simplicity those entities/interfaces are not shown. As shown, the EPS 100 provides packet-switched services; however, as those skilled in the art will readily appreciate, the various concepts presented throughout this disclosure may be extended to networks providing circuit-switched services. Moreover, while an LTE network is illustrated as an example, other types of networks may also be used, including, for example only, a 5G network.

The E-UTRAN 104 includes a base station 106, such as, for example, the evolved Node B (eNB) 106 and other eNBs 108, which may include a gNodeB (gNB), a Home NodeB, a Home eNodeB, or a base station using some other suitable terminology. For example, in 5G or New Radio (NR) networks, a base station may be referred to as a gNB. The E-UTRAN 104 may also include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, a drone, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
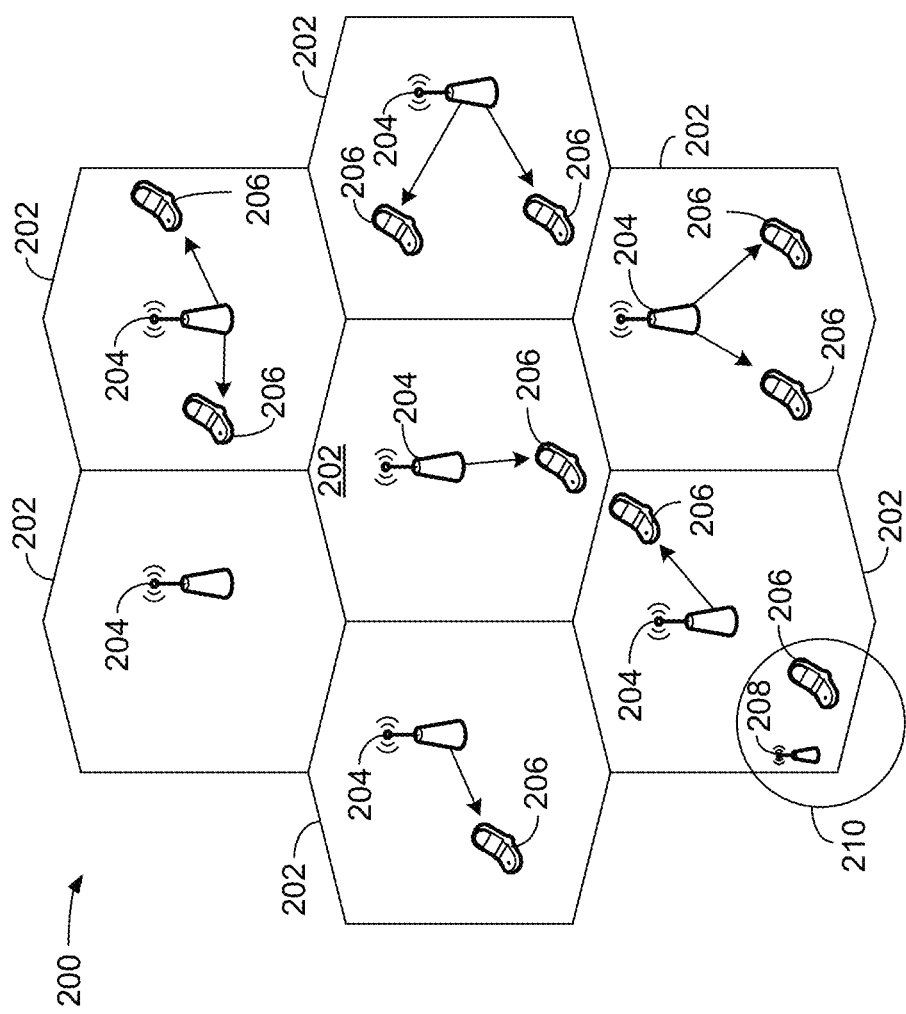
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs/gNBs 208 may have cellular regions 210 that overlap with one or more of the cells 202. The lower power class eNB/gNB 208 may be a femto cell (e.g., home eNB (HeNB)), pico cell, micro cell, or remote radio head (RRH). The macro eNBs/gNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs/gNBs 204 are responsible for all radio related functions including radio bearer control, admission control, mobility control, scheduling, security, and connectivity to the serving gateway 116. An eNB/gNB may support one or multiple (e.g., three) cells (also referred to as a sectors). The term "cell" can refer to the smallest coverage area of an eNB/gNB and/or an eNB/gNB subsystem serving a particular coverage area. Further, the terms "eNB," "gNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs/gNBs 204 may have multiple antennas supporting MIMO technology. The use of MIMO technology enables the eNBs/gNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB/gNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-PDMA in the form of a DFT-spread OFDM signal to compensate for high peak-to-average power ratio (PAPR).

Figure 3:
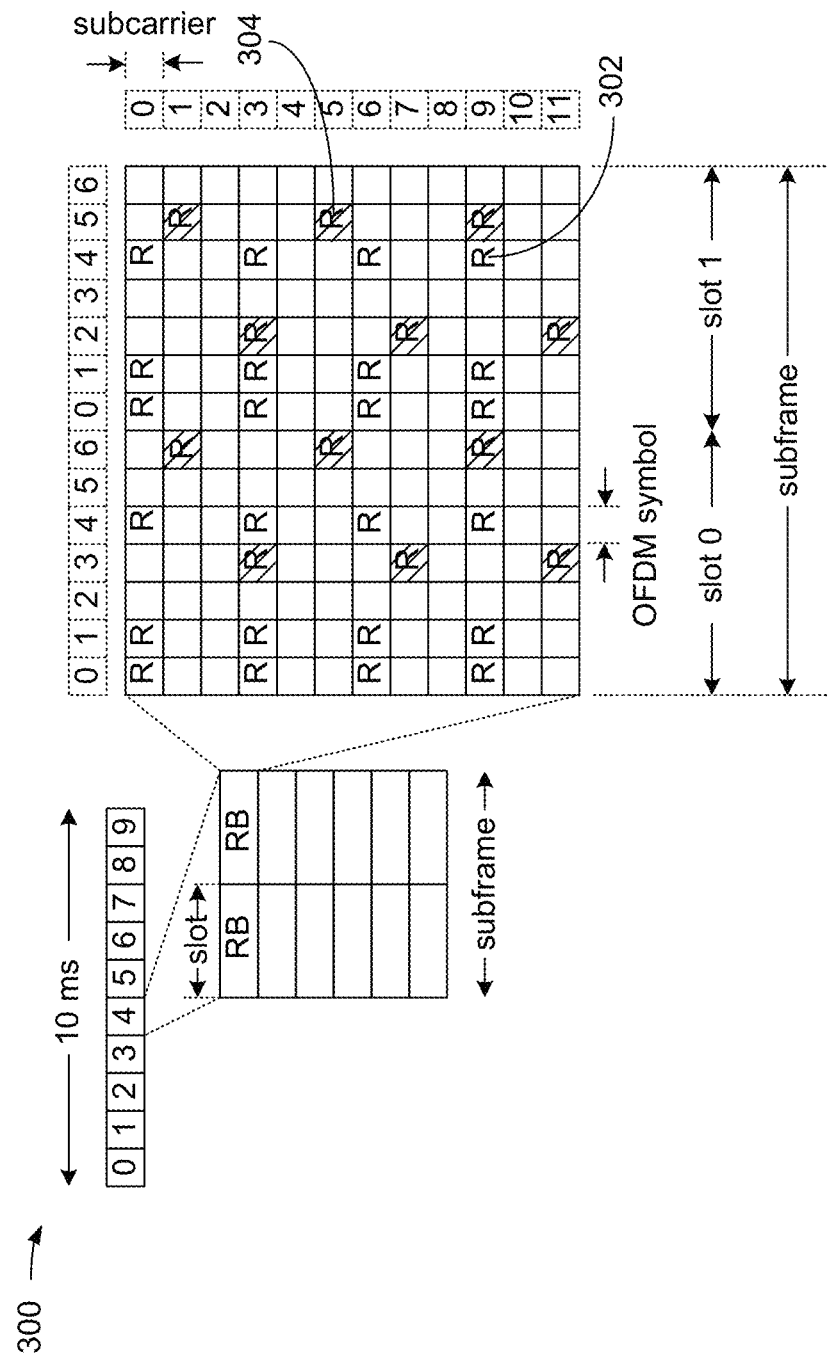
FIG. 3 is a diagram illustrating an example of a downlink (DL) frame structure in LTE, in accordance with various aspects of the present disclosure.

FIG. 3 is a diagram 300 illustrating an example of a downlink (DL) frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements are possible. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the data density of the modulation scheme, the higher the data rate for the UE.

Figure 4:
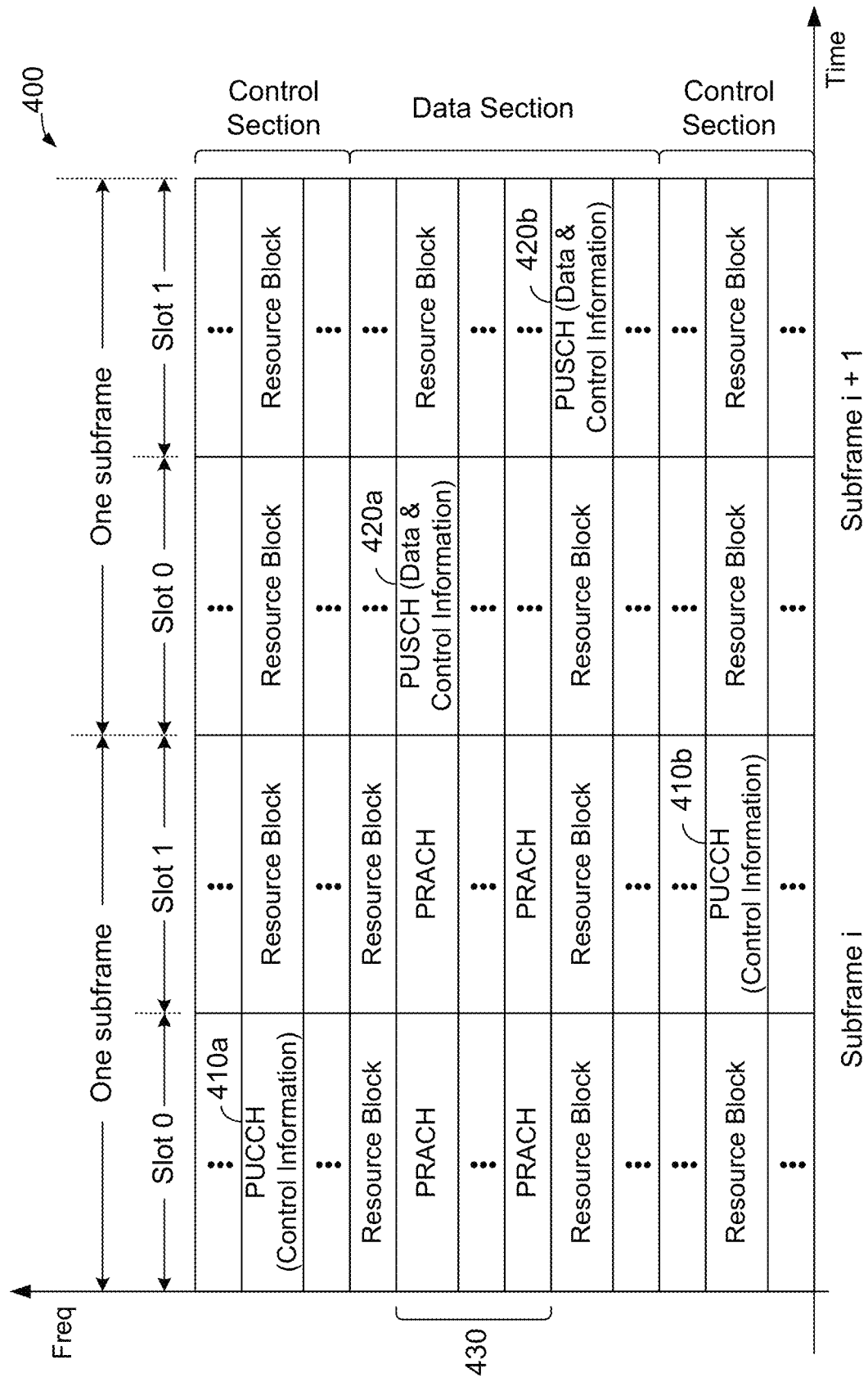
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB/gNB. The UE may also be assigned resource blocks 420a, 420b in the data section to transmit data to the eNB/gNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
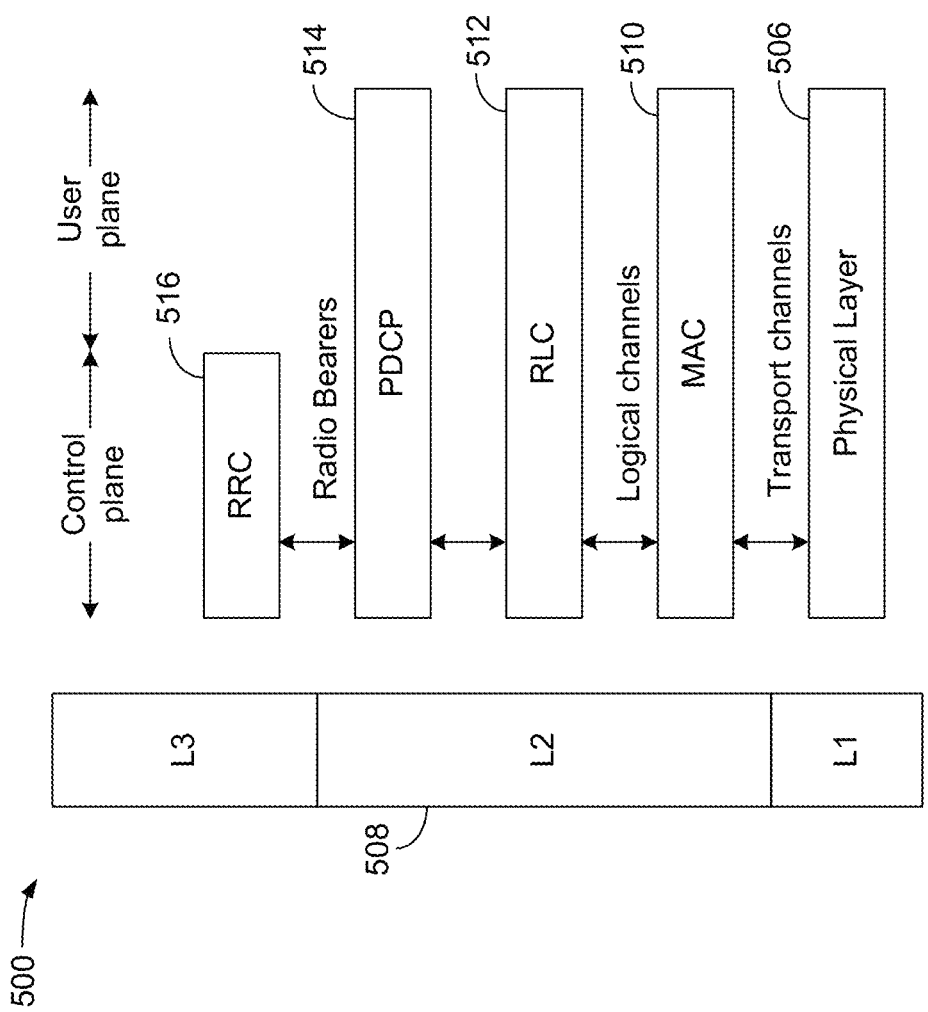
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
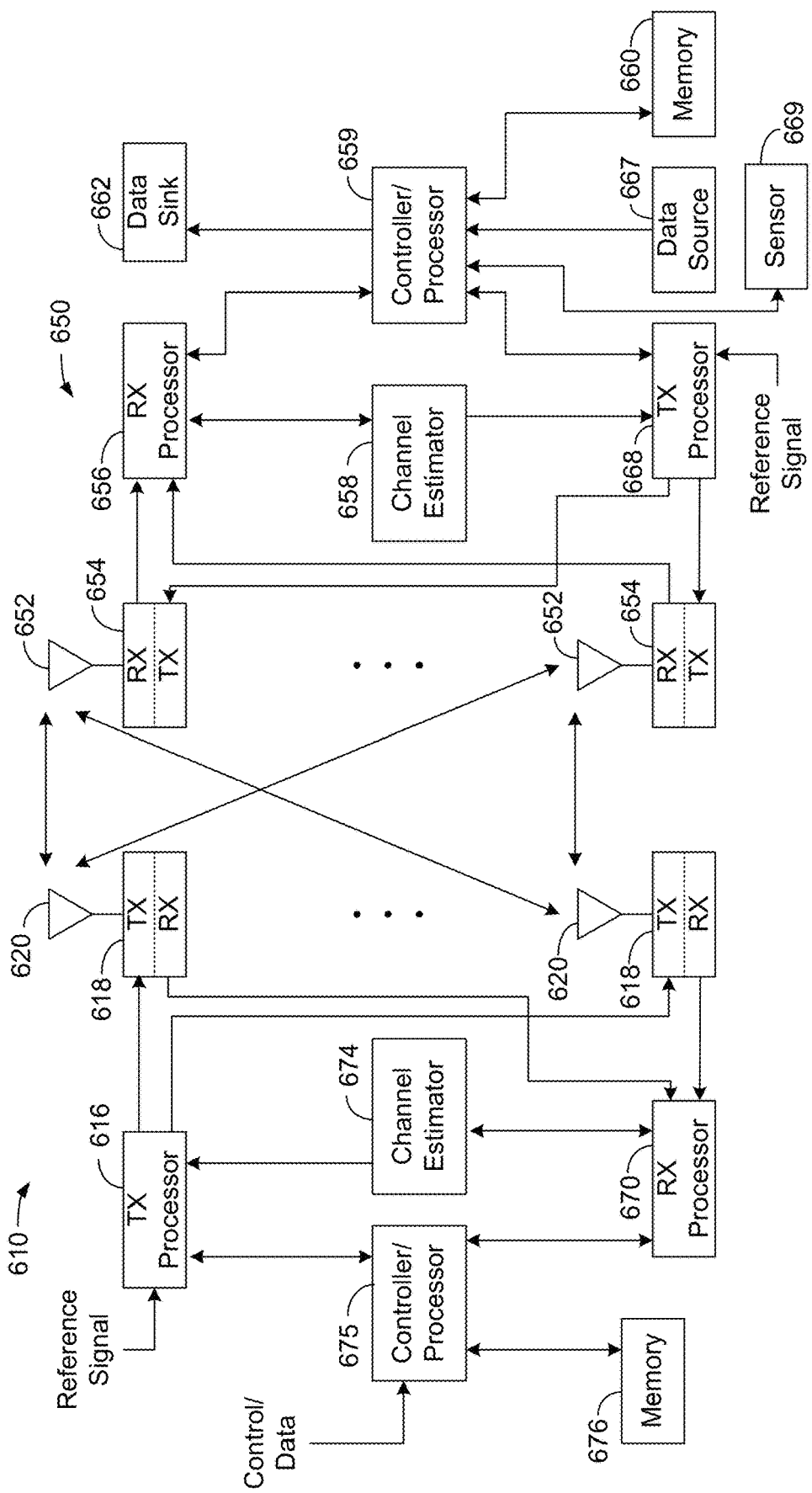
FIG. 6 is a diagram illustrating an example of an evolved Node B and user equipment in an access network in accordance with various aspects of the present disclosure.

FIG. 6 is a block diagram of an eNB/gNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The UE 650 may also comprise one or more internal sensors, collectively shown as sensor element 669 coupled to the controller/processor 659. The sensor element 669 may comprise one or more sensors, such as a motion sensor, a location sensor, etc., configured to allow the UE 650 to determine, for example, its location, its orientation, the location of a hand or other part of human anatomy in relation to the UE 650, and in particular, the relation of anatomy to the antenna arrays on the UE 650, etc.

Figure 7:
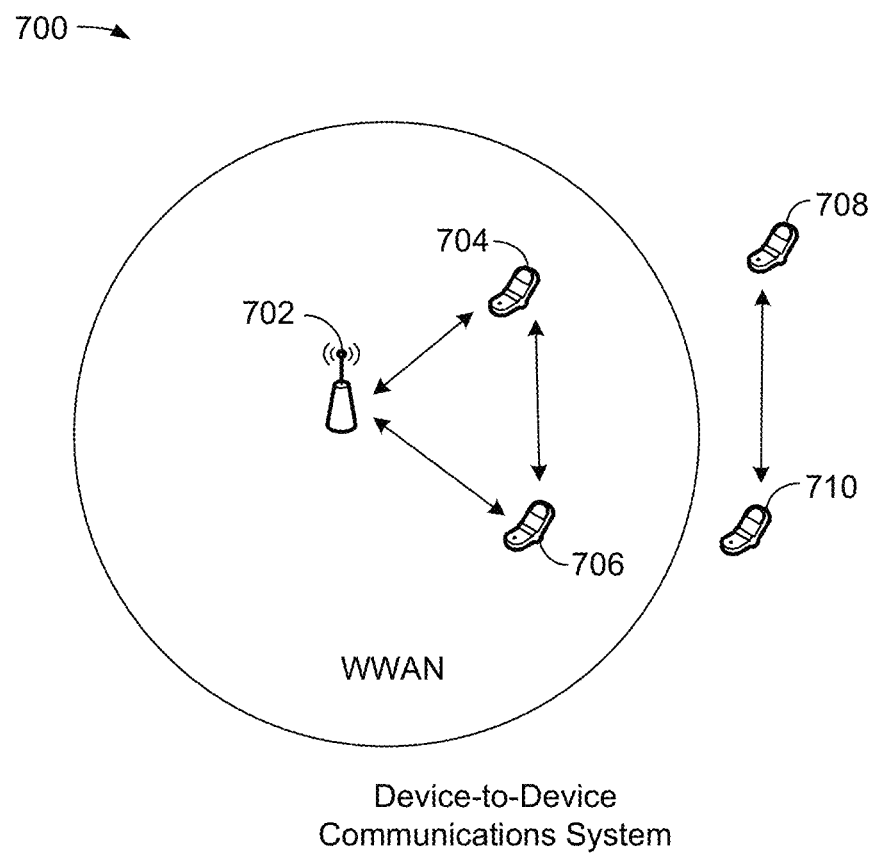
FIG. 7 is a diagram of a device-to-device communications system in accordance with various aspects of the present disclosure.

FIG. 7 is a diagram of a device-to-device (D2D) communications system 700 in accordance with various aspects of the present disclosure. The device-to-device communications system 700 may be implemented by the network shown in FIG. 1, and, in an exemplary embodiment, includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

In one configuration, some or all of the UEs 704, 706, 708, 710 may be equipped or located on vehicles. In such a configuration, the D2D communications system 700 may also be referred to as a vehicle-to-vehicle (V2V) communications system.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 8:
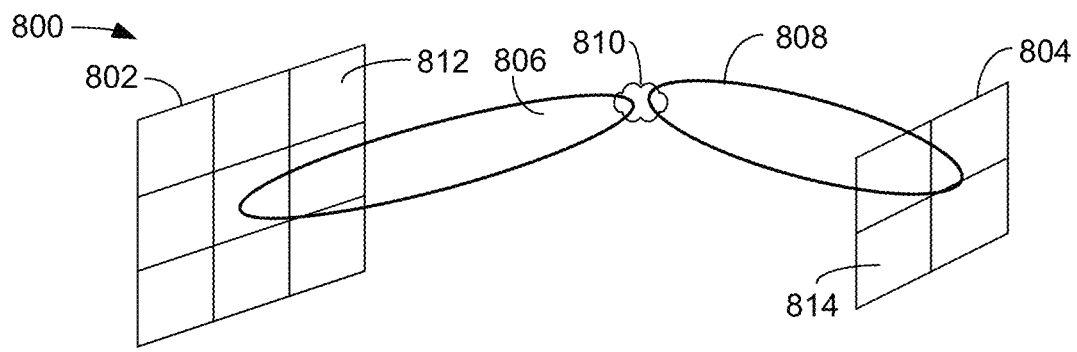
FIG. 8 is a diagram illustrating an example of beamforming in a low-frequency wireless communication system (e.g., LTE).

FIG. 8 is a diagram 800 illustrating an example of beamforming in a low-frequency wireless communication system (e.g., LTE). FIG. 8 includes antenna arrays 802 and 804. In an exemplary embodiment, the antenna array 802 may include a number of antenna elements (e.g., antenna element 812) arranged in a grid pattern (e.g., a planar array) and may be located in a base station. In an exemplary embodiment, the antenna array 804 may include a number of antenna elements (e.g., antenna element 814) arranged in a grid pattern and may be located in a UE. As shown in FIG. 8, the antenna array 802 may transmit beam 806 and the antenna array 804 may receive via beam 808. In an exemplary embodiment, the beams 806 and 808 may reflect, scatter, and/or diffract via the cluster located at area 810.

Figure 9:
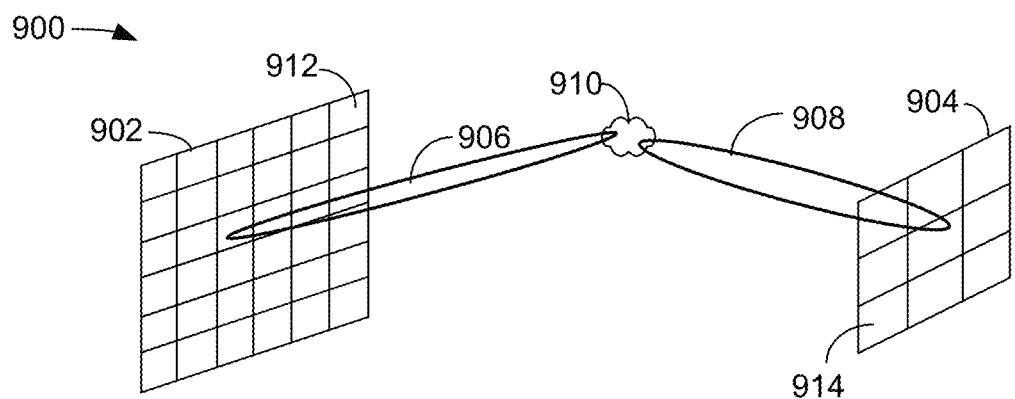
FIG. 9 is a diagram illustrating beamforming in a high-frequency wireless communication system (e.g., an mmW system).

FIG. 9 is a diagram 900 illustrating beamforming in a high-frequency wireless communication system (e.g., an mmW system). FIG. 9 includes antenna arrays 902 and 904. In an exemplary embodiment, the antenna array 902 may include a number of antenna elements (e.g., antenna element 912) arranged in a grid pattern and may be located in an mmW-base station. In an exemplary embodiment, the antenna array 904 may include a number of antenna elements (e.g., antenna element 914) arranged in a grid pattern and may be located in a UE. As shown in FIG. 9, the antenna array 902 may transmit beam 906 and the antenna array 904 may receive via beam 908. In an exemplary embodiment, the beams 906 and 908 may reflect, scatter, and/or diffract via the cluster located at area 910.

It should be noted that the antenna array 902 in FIG. 9 includes a greater number of antenna elements than the antenna array 802 in FIG. 8, and that the antenna array 904 in FIG. 9 includes a greater number of antenna elements than the antenna array 804 in FIG. 8. The greater number of antennas in the former scenario (relative to the latter) is because of the larger carrier frequency corresponding to smaller wavelengths that allows the deployment of a greater number of antennas within the same aperture/area. The greater number of antenna elements in antenna arrays 902 and 904 allow the beams 906 and 908 to have a narrow half-power beam width offering a high angular resolution relative to the beams 806 and 808 from antenna arrays 802 and 804. Therefore, the lower number of antenna elements in antenna arrays 802 and 804 in the low-frequency wireless communication system may result in a wider angular resolution, while providing a better link margin than in the mmW system.

In a stand-alone mmW wireless communication system, the high link losses (due to penetration, diffraction, reflection, etc.) may prevent discovery of the angular information of multipath. In contrast, a low-frequency wireless communication system may provide a link having a higher quality (e.g., a link having higher SNR) than a link in a stand-alone mmW wireless communication system. This higher SNR of the low-frequency wireless communication system and the coexistence of the low-frequency and the stand-alone mmW wireless communication systems may be leveraged to determine the angular information and/or relative path gains for the beamforming scheme. Since the angular information and/or relative path gains for the beamforming scheme is only determined by the relative geometries of the transmitter, the receiver, and the scatterers, such angular information and/or relative path gains are generally invariant in both stand-alone mmW and low-frequency wireless communication systems. While there are scenarios where the ranking (of dominance) of paths could change with changing carrier frequency (e.g., due to differential scattering and/or absorption losses at different frequencies), such ranking may not change in a majority of cases.

Methods for learning angles of arrival and departure of beams successful at high SNR may be used to learn the angles of arrival and departure of beams in a low-frequency wireless communication system. Such methods may include MUltiple SIgnal Classification (MUSIC), Estimation of Signal Parameters via Rotation Invariant Techniques (ESPRIT), Space-Alternating Generalized Expectation-maximization (SAGE) algorithm, etc. In some scenarios, the wide beam widths of the low-frequency transmissions in low-frequency wireless communication systems may result in poor angular precision. In an exemplary embodiment, the angles learned for the low-frequency wireless communication system may serve as a coarse estimate for the angles (also referred to as angular information) needed for beamforming in the mmW wireless communication system. A refined estimate of the angular information for the mmW wireless communication system may be determined using the coarse angle estimate obtained via the low-frequency wireless communication system as the initial value (also referred to as the seed value). For example, the refined estimate may be determined using algorithms, such as fine-beam tuning or constrained MUSIC.

The asymmetric capabilities between an mmW wireless communication system and low-frequency wireless communication system may be leveraged to reduce complexity in the algorithms used to implement the mmW wireless communication system and low-frequency wireless communication system. For example, low-frequency wireless communication systems may use a fewer number of antennas than mmW wireless communication systems. Such asymmetry in number of antennas may be leveraged to estimate the probable signal directions in algorithms, such as MUSIC, ESPRIT and/or SAGE. It should be noted that estimating the probable signal directions with any such algorithm (e.g., MUSIC, ESPRIT, and/or SAGE) is based on obtaining an accurate estimate of the signal covariance matrix. For example, an accurate estimate of the signal covariance matrix may be achieved using a smaller number of training samples (or shorter covariance matrix acquisition and angle learning periods) and with lower computational cost (smaller number of multiplications and additions, and matrix inversion of smaller dimension) for smaller antenna systems than for larger dimensional systems.

The asymmetric capabilities between the transmitter and the receiver may be leveraged to proportionally allocate more resources for angle determination in the low-frequency wireless communication system than the mmW wireless communication system. For example, the asymmetric capabilities may include a different number of antennas at the transmitter and the receiver, different beamforming capabilities (e.g., digital beamforming capability or RF beamforming capability) between the transmitter and the receiver, and/or lower power at the receiver.

In exemplary embodiment, the cell frame and OFDM symbol timing information obtained from the low-frequency wireless communication system may be used as an initial value for further refinement with the mmW wireless communication system. In such exemplary embodiment, since the low-frequency wireless communication system generally provides a better SNR than the mmW wireless communication system, these quantities may be estimated more reliably at lower frequencies (e.g., below 6.0 GHz) than at higher frequencies (e.g., frequencies between 10.0 GHZ to 300.0 GHz). The cell frame and/or OFDM symbol timing information may be determined using synchronization signals (e.g., primary synchronization signals (PSSs) and secondary synchronization signals (SSSs)) that enable a UE to synchronize with the cell and detect quantities of interest, such as cell frame timing, carrier frequency offset, OFDM symbol timing, and/or cell identification (ID).

The carrier frequency offset may be estimated for the mmW wireless communication system after fine-tuning around the estimate provided by the low-frequency wireless communication system. For example, the fine-tuning may be performed with a smaller number of frequency hypotheses. Therefore, low-frequency assistance may significantly enhance the performance of the mmW protocols with respect to latency, lower SNR requirements for the same performance, and/or lower computational cost.

Figure 10:
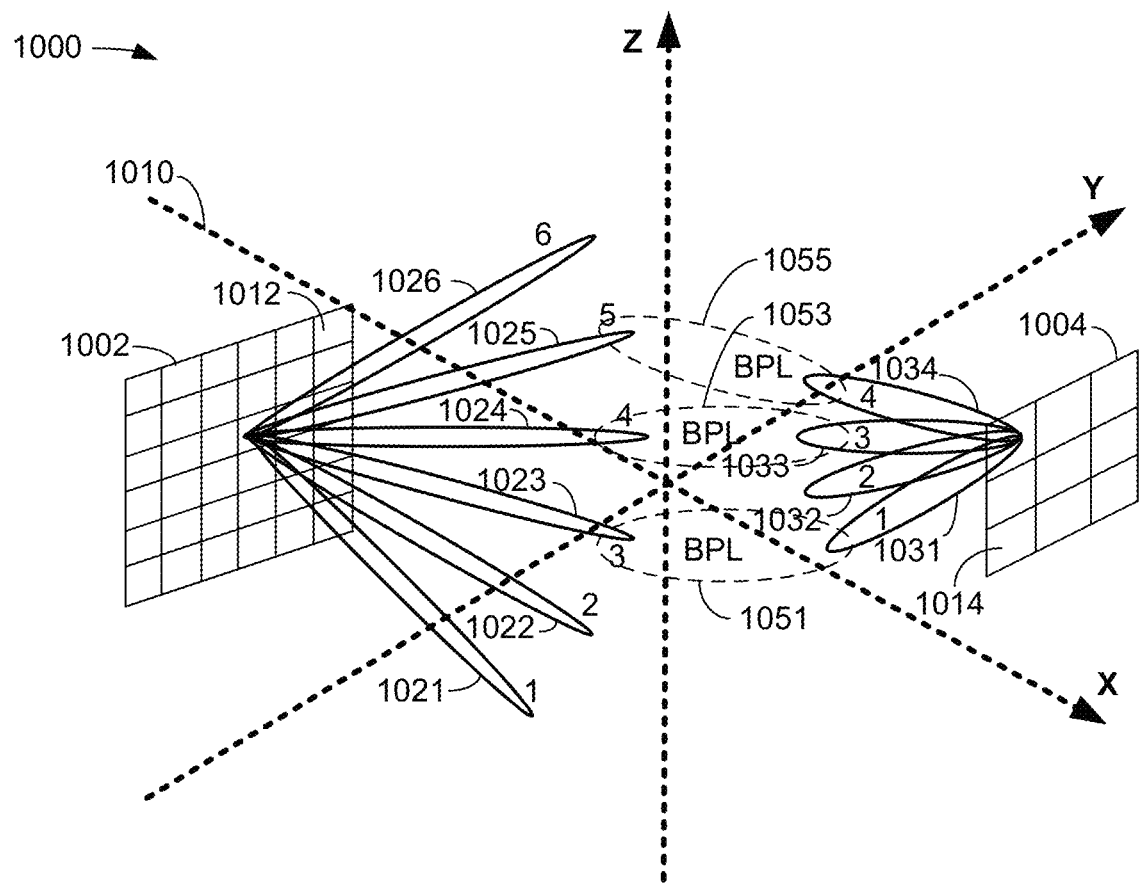
FIG. 10 is a diagram illustrating a communication system in accordance with various aspects of the present disclosure.

FIG. 10 is a diagram illustrating a communication system in accordance with various aspects of the present disclosure. A communication system 1000 may comprise a base station (not shown) having a base station antenna array 1002 and a UE (not shown) having a UE antenna array 1004. The antenna array 1002 may include a number of antenna elements (e.g., antenna element 1012) arranged in a grid pattern and may be located in a base station and the antenna array 1004 may include a number of antenna elements (e.g., antenna element 1014) arranged in a grid pattern and may be located in a UE.

The antenna array 1002 and the antenna array 1004 are shown in relation to a global coordinate system (GCS) 1010. The GCS 1010 is shown as a Cartesian coordinate system having orthogonal X, Y and Z axes, but may be any coordinate system, such as a polar coordinate system. The GCS 1010 may be used to define the location of the antenna array 1002 and the antenna array 1004, and communication beams related to the antenna array 1002 and the antenna array 1004.

In an exemplary embodiment, the antenna array 1002 is shown as generating six (6) communication beams 1021, 1022, 1023, 1024, 1025 and 1026, also labeled 1 through 6 in FIG. 10. In an exemplary embodiment, the antenna array 1004 is shown as generating four (4) communication beams 1031, 1032, 1033, and 1034, also labeled 1 through 4 in FIG. 10. It is understood that the antenna array 1002 and the antenna array 1004 are capable of generating many more communication beams than the communication beams shown in FIG. 10. Further, the communication beams generated by the antenna array 1002 and the antenna array 1004 are capable of generating transmission and reception communication beams.

In an exemplary embodiment, at least some of the communication beams 1021, 1022, 1023, 1024, 1025 and 1026 and at least some of the communication beams 1031, 1032, 1033, and 1034 may form a beam pair link (BPL), and in an exemplary embodiment, may form a number of BPLs. In an exemplary embodiment, the communication beam 1023 and the communication beam 1032 may form a BPL 1051, thus allowing communication devices associated with the antenna array 1002 and the antenna array 1004 to bi-directionally communicate. Similarly, the communication beam 1024 and the communication beam 1033 may form a BPL 1053 and the communication beam 1025 and the communication beam 1034 may form a BPL 1055. Although three BPLs 1051, 1053 and 1055 are shown in FIG. 10, more or fewer BPLs may exist between the antenna array 1002 and the antenna array 1004. In an exemplary embodiment, the communication beams 1023, 1024, 1025, 1031, 1033 and 1034 may be referred to as "serving beams" when they are being used for active communication and the communication beams 1021, 1022, 1026, and 1032 may be referred to as target beams or candidate beams if they are available for communication.

In an exemplary embodiment, beamforming leads to higher spectral efficiency in mmW, or 5G or NR systems. UE-specific and base station-specific (5G-NR non-specified) analog codebooks may be used for beamforming at the UE and the base station, respectively. Such codebook designs are typically proprietary both at the base station and the UE. Typical codebook/beam design constraints include, for example, antenna array gain vs. coverage tradeoffs.

Figure 11A:
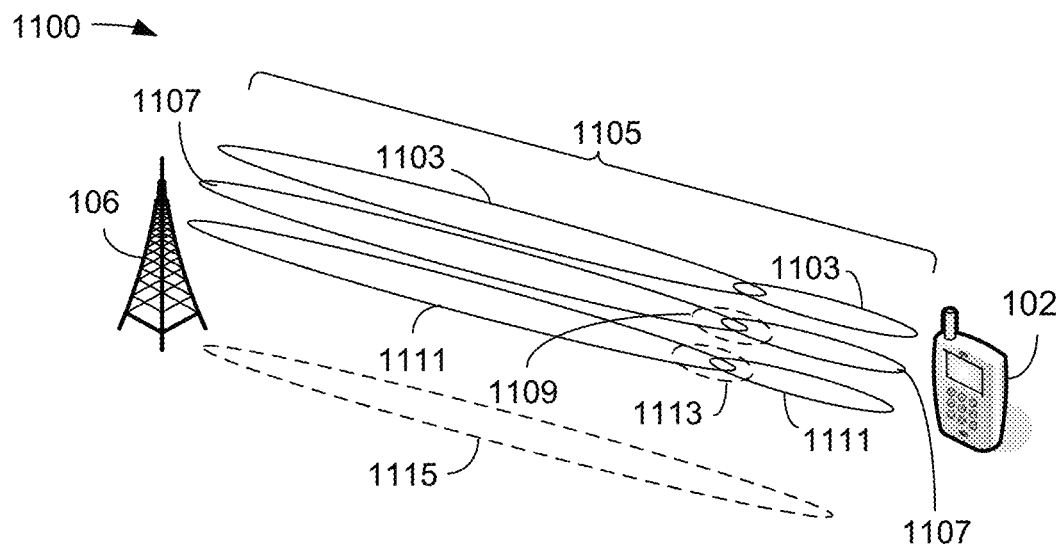
FIG. 11A is a diagram of a communication system including a base station and a UE for use in wireless communication, in accordance with various aspects of the present disclosure.

FIG. 11A is a diagram 1100 of a communication system including a base station 106 and a UE 102 for use in wireless communication, in accordance with various aspects of the present disclosure. The base station 106 may be an example of one or more aspects of a base station described with reference to FIG. 1. It may also be an example of a base station described with reference to FIG. 6.

The UE 102 may be an example of one or more aspects of a UE described with reference to FIG. 1. It may also be an example of a UE described with reference to FIG. 6.

The UE 102 may be in bi-directional wireless communication with the base station 106. In an exemplary embodiment, the UE 102 may be in bi-directional wireless communication with the base station 106 over a serving beam 1103, which may also be referred to as a BPL 1105. A serving beam may be a communication beam that conveys control information, referred to as a control beam, may be a communication beam that conveys data, referred to as a data beam, or may be other communication beams. In an exemplary embodiment, the serving beam 1103 may comprise a transmit beam sent from the base station 106 and a receive beam tuned to by the UE 102, and may comprise a transmit beam sent by the UE 102 and a receive beam tuned to by the base station 106. The BPL 1105 is intended to depict bi-directional communication between the UE 102 and the base station 106 using a combination of transmit and receive beams that cooperate to create the bi-directional communication link. In an exemplary embodiment, the serving beam 1103 may be one of a plurality of directional communication beams that may be configured to operatively couple the UE 102 to the base station 106. In an exemplary embodiment, at a given time, the serving beam 1103, and BPL 1105, may be able to provide the most robust communication link between the UE 102 and the base station 106.

In an exemplary embodiment, other serving beams may also be established between a UE 102 and the base station 106. For example, serving beams 1107 may establish a BPL 1109 between the UE 102 and the base station 106; and serving beam 1111 may establish a BPL 1113 between the UE 102 and the base station 106.

In an exemplary embodiment, one or more target or candidate beams may also be available to provide a communication link between the UE 102 and the base station 106. In an exemplary embodiment, the candidate beam 1115 represents one of a plurality of available candidate beams, and is shown in dotted line to indicate that it is not actively providing an operative communication link between the UE 102 and the base station 106. In an exemplary embodiment, the candidate beam 1115 may comprise transmit and receive beams generated by the base station 106 and the UE 102 that may together form the candidate beam 1115.

Figure 11B:
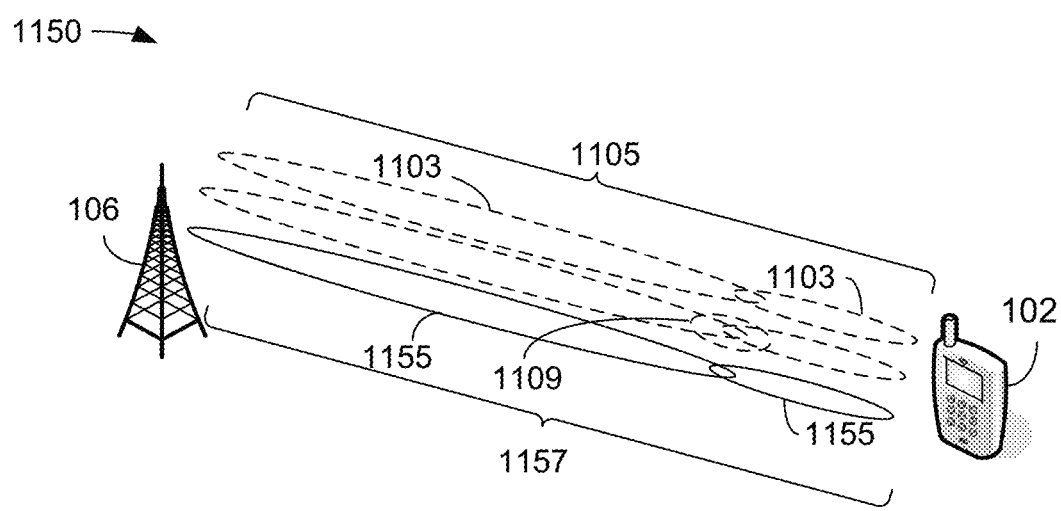
FIG. 11B is a diagram of a communication system including a base station and a UE for use in wireless communication, in accordance with various aspects of the present disclosure.

FIG. 11B is a diagram 1100 of a communication system including a base station 106 and a UE 102 for use in wireless communication, in accordance with various aspects of the present disclosure. FIG. 11B illustrates partial beam pair link failure. For example, in FIG. 11B, the BPL 1105 and the BPL 1109 have experienced RLF in that they are unable to continue to establish and maintain a radio communication link between the UE 102 and the base station 106. However, the serving beam 1155 and the BPL 1157, are still established between the UE 102 and the base station 106, giving rise to the term "partial" BPL loss, in that communication between the UE 102 and the base station 106 is still available over at least one communication beam, that being the serving beam 1155 and BPL 1157 in this example.

Existing beam failure recovery procedures handle the situation when all serving control beams fail. New candidate beam identification is only based on the transmission of periodic reference signals, such as channel state information-reference signal (CSI-RS) or a synchronization signal (SS) period, from the base station 106 to a UE 102 because the UE 102 cannot communicate with the base station 106 until a new candidate beam is found and communication is transitioned to the new candidate beam. In this prior methodology, there is a delay of at least one communication period for candidate beam identification after beam failure detection, because the UE has to wait for the next periodic opportunity to search for candidate beams. Multiple uplink (UL) resources have to be reserved for the beam failure recovery request, so that the base station can perform a receive (RX) beam sweep over and across different directions for reception of this request.

In an exemplary embodiment, an efficient procedure is described to handle partial beam pair link (BPL) loss, where a subset of the control beams fail, but where at least one control beam remains available for communication between a UE 102 and a base station 106. In an exemplary embodiment, multiple control beams are supported in 5G NR for robustness against beam failure.

Partial BPL loss recovery has an advantage in recovery time over existing beam failure recovery procedures because for partial BPL loss, there exists at least one good control BPL that a UE may use to notify a base station and immediately trigger a beam recovery procedure, without waiting for a signal from the base station, which would be delayed by the above-mentioned at least one communication period.

Partial BPL loss recovery also has an advantage in saving resources because the new identified BPL can be immediately conveyed to the base station by the UE using a good remaining control BPL without the need to reserve multiple uplink (UL) resources for RX beam sweep at the base station for reception of the beam failure recovery request that the UE sends to the base station on the remaining good BPL.

In an exemplary embodiment, for partial BPL loss, there exists at least one good control BPL that allows a UE to notify a base station (gNB) and immediately trigger a beam recovery procedure under partial BPL loss conditions.

In an exemplary embodiment, in case of partial BPL loss, new candidate beams can be identified sooner using the proposed scheme than an existing procedure for beam failure recovery.

In an exemplary embodiment, instead of waiting for the next channel state information-reference signal (CSI-RS) or synchronization signal (SS) period, a UE can notify a base station (gNB) about partial BPL loss immediately after the failure detection using a good remaining BPL, and then the UE may expect the base station (gNB) to schedule an aperiodic CSI-RS for a candidate beam search. As used herein, the term "aperiodic" refers to a base station scheduling a CSI-RS for a candidate beam search immediately upon receipt of the loss indication from the UE, and not waiting for a normal periodically occurring CSI-RS event.

In an exemplary embodiment, a UE may notify a base station about a detected partial BPL loss by sending a specific physical uplink control channel (PUCCH) communication similar to a scheduling request (SR) that may be defined for partial BPL loss indication.

In an exemplary embodiment, a UE may notify a base station about a detected partial BPL loss by a base station allowing aperiodic beam reporting initiated by a UE whenever partial BPL loss is detected by a UE. The aperiodic beam report can be carried by, for example, a PUCCH signal, or by an uplink (UL) medium access control (MAC) control element (CE) in a physical uplink shared channel (PUSCH) communication from a UE.

A UE may transmit a BPL addition request with new beam information. The BPL addition request can be defined as a specific PUCCH signal similar to a scheduling request (SR), but with additional bits to indicate new beam information.

In another exemplary embodiment, a specific PUCCH signal similar to SR, but with additional bits to capture both partial BPL loss indication and BPL addition request may be used by a UE to initiate communication beam transition to a candidate beam.

Figure 12:
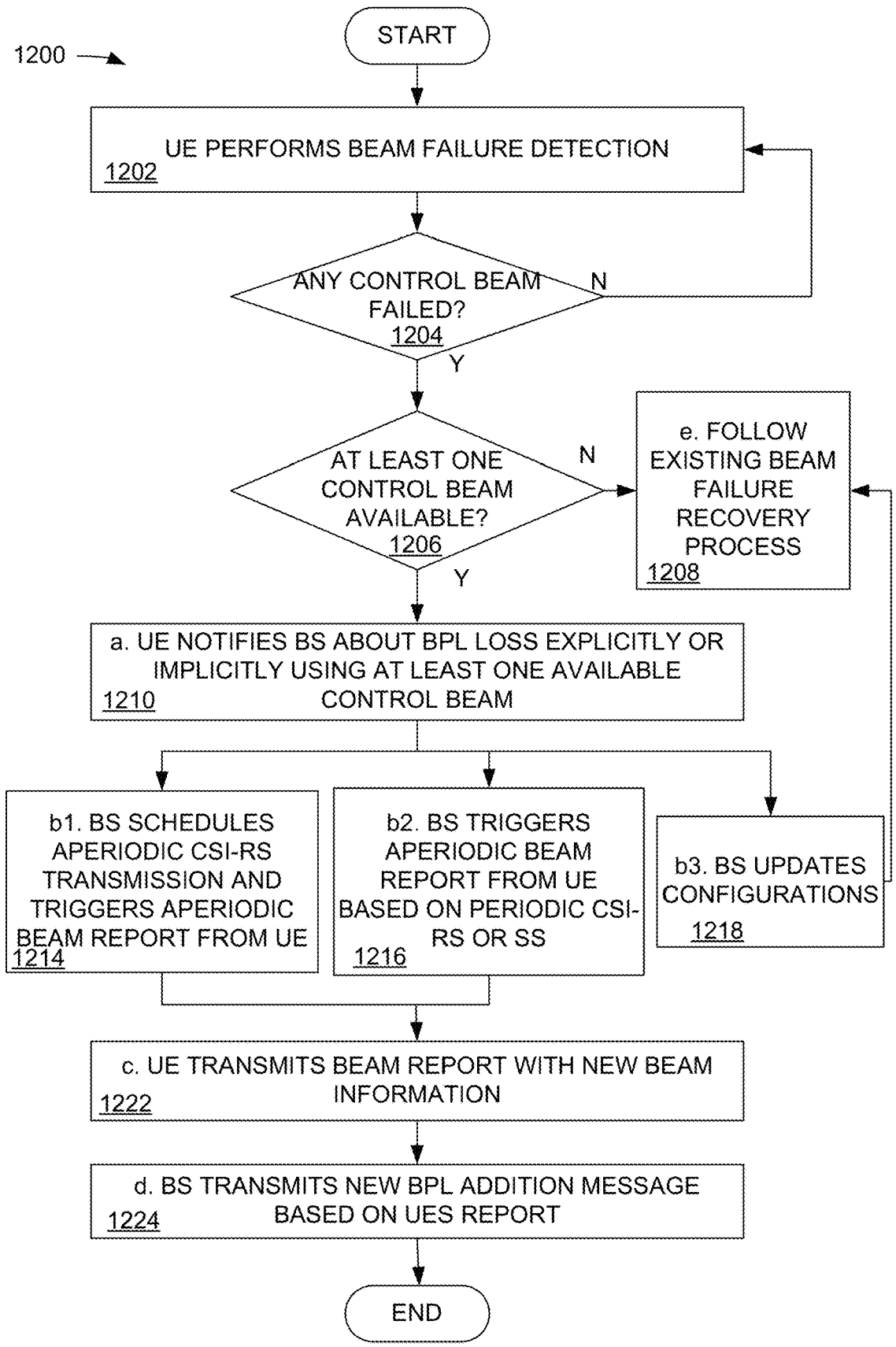
FIG. 12 is a flow chart illustrating an example of a method for communication, in accordance with various aspects of the present disclosure.

FIG. 12 is a flow chart illustrating an example of a method for communication, in accordance with various aspects of the present disclosure. The blocks in the method 1200 can be performed in or out of the order shown, and in some embodiments, can be performed at least in part in parallel.

In block 1202, a UE performs communication beam failure detection.

In block 1204, it is determined by the UE whether any communication control beams have failed.

If, in block 1204 it is determined that there are no control beam failures, then the process returns to block 1202, where the UE continues to perform communication beam failure detection. If, in block 1204 it is determined that any control beams have failed, then the process proceeds to block 1206.

In block 1206, the UE determines whether at least one control beam remains available for communication with a base station. If, in block 1206 the UE determines that there are no control beam remains available for communication with a base station, then the process proceeds to block 1208, where the UE follows existing beam failure recovery procedures where all communication beams have failed.

If, in block 1206 the UE determines that there is at least one control beam available for communication with a base station, then the process proceeds to block 1210.

In block 1210, a UE may notify a base station about the partial BPL loss explicitly or implicitly using at least one available communication control beam.

For example, a UE may notify a base station about the partial BPL loss explicitly or implicitly so that the base station can take further actions for beam management. As used herein, the term "explicit notification" means that a UE proactively and without waiting for a periodic CSI-RS or SS signal from the base station explicitly notifies the base station about the partial BPL loss event.

The term "implicit notification" can cover many mechanisms, e.g., the notification can be a UE's request for a base station to trigger aperiodic CSI-RS and/or aperiodic beam report, etc.

In an exemplary embodiment, at least two options are proposed for the UE to transmit this "explicit or implicit" notification to the base station regarding the partial BPL loss.

In an exemplary embodiment, a new PUCCH format similar to a scheduling request (SR) may be defined in the physical layer for this notification.

In an exemplary embodiment, a general PUCCH request signal may be used to cover the UE's requests. In LTE, only one request signal is defined in the PUCCH: A SR to request a grant for UL resources. In 5GNR, a UE may send UL requests for different purposes. For example, a SR, a partial BPL loss indication signal, a beam refinement request, an aperiodic beam report request, and a beam failure recovery request, etc.

In an exemplary embodiment, an on-off PUCCH signal with information bits to indicate different request types may be used by the UE to send the partial BPL loss indication to the base station. Additional bits may also be carried by this PUCCH signal to convey other related information, for example, to indicate a new beam index in case of beam failure recovery request, or to indicate indices of failing BPLs in the case of partial loss indication.

In an exemplary embodiment, an on-off PUCCH signal with different signal sequences, e.g., using different cyclic shifts, to indicate different request types may be used by the UE. A periodic PUCCH resource may be reserved for the UE to send the proper request when needed. For example, different cyclic shifts may be assigned to a UE, and each cyclic shift may correspond to one or more of the following PUCCH request types: a SR, a partial BPL loss indication, a beam refine request, an aperiodic beam report request, and a beam failure recovery request, etc.

In another exemplary embodiment, a UE may transmit this "explicit or implicit" notification to the base station regarding the partial BPL loss using a new uplink (UL) medium access control (MAC) control element (CE) that may be defined in the MAC layer for this notification. Such an UL MAC CE may be able to trigger an SR similar to a BSR MAC CE so that it can be transmitted in time with the allocated PUSCH resource. For this option, changes are implemented in the MAC layer, and no changes are implemented in the physical layer.

In block 1214, in an exemplary embodiment, upon receipt of the BPL loss notification from the UE, the base station may send an aperiodic CSI-RS transmission and trigger an aperiodic beam report from the UE.

In block 1216, in an exemplary embodiment, upon receipt of the BPL loss notification from the UE, the base station may trigger an aperiodic beam report from the UE based on a periodic CSI-RS signal or a periodic SS signal.

In block 1218, in an exemplary embodiment, upon receipt of the BPL loss notification from the UE, the base station may update at least some of its configurations, after which the process returns to block 1208. For example, the base station may reduce the periodicity (the period), or the frequency of transmission, of the SS signal or the CSI-RS signal so that the UE can discover a new candidate beam sooner when performing the beam failure recovery process indicated by block 1208.

In block 1222, after receiving either the aperiodic CSI-RS transmission (block 1214) from the base station, or the request for the aperiodic beam report based on a periodic CSI-RS signal or a periodic SS signal (block 1216) from the base station, the UE transmits a beam status report with new beam information to the base station.

In block 1224, the base station transmits a new BPL addition message to the UE based on the UEs beam status report sent in block 1222.

The steps in blocks 1210, 1214, 1216, 1218, 1222 and 1224 all occur over one of the good control BPLs.

There are multiple possible options to handle partial BPL loss.

In an exemplary embodiment (alternative 1) referring to blocks 1210, 1214, 1222 and 1224 of FIG. 12, (a, b1, c, d), upon reception of UE's BPL loss notification, the base station schedules an aperiodic CSI-RS transmission for the UE to perform a candidate beam search, and the base station also triggers an aperiodic beam status report from the UE at a specified time after the transmission of the aperiodic CSI-RS. In this embodiment, a candidate beam can be found and reported to the base station immediately without need to wait for the next periodic CSI-RS or SS opportunity.

In another exemplary embodiment (alternative 2) referring to blocks 1210, 1216, 1222 and 1224 of FIG. 12, (a, b2, c, d), the candidate beam search is still based on a periodic CSI-RS or SS signal. However, upon reception of the UE's partial BPL loss notification, the base station triggers an aperiodic beam status report from the UE to obtain new identified candidate beams from the UE. In an exemplary embodiment, the new identified candidate beams are reported by the UE using a non-failing control BPL, and thus the base station does not need to perform an RX beam sweep for reception of the beam report message from the UE. This approach can be useful in the situation where the next periodic CSI-RS or SS opportunity is close, so there will not be a long delay if the UE awaits this next periodic CSI-RS or SS opportunity from the base station.

In another exemplary embodiment (alternative 3) referring to blocks 1210, 1218, 1222 and 1224 of FIG. 12, (a, b3, c, d), an existing beam failure recovery procedure is reused. However, upon reception of UE's partial BPL loss notification, the base station may update some of its configurations (block 1218) so that a recovery procedure can be done more efficiently. For example, the base station may reduce the periodicity of the CSI-RS signal or the SS signal so that candidate beams can be found sooner. The base station may also update the PRACH configuration for beam failure recovery request.

In another exemplary embodiment (alternative 4), the UE may just use existing beam failure recovery process.

Upon detection of partial BPL loss, a UE may decide whether to send a notification to a base station. If a notification is sent by the UE to a base station, the base station may determine whether to take the method of blocks 1214, 1222, 1224 (alternative 1); blocks 1216, 1222, 1224 (alternative 2); or blocks 1218, 1222, 1224 (alternative 3), based on its status. For example, alternative 1 can be used if the time to the next periodic CSI-RS or SS opportunity exceeds a threshold.

Alternative 2 may be used if the time to the next periodic CSI-RS or SS opportunity is below a threshold.

Alternative 3 may be used if the base station cannot schedule an aperiodic CSI-RS or trigger a beam report due to certain constraints.

If none of alternatives 1, 2 or 3 are possible, the UE may use the existing beam failure recovery procedure.

In an exemplary embodiment, a base station may identify a downlink (DL) non-failing control BPL through a "beam-reciprocal case", for example, using the base stations RX beam on which the UE's BPL loss indication was communicated, or through a "non-beam-reciprocal case", where the DL beam associated with the BPL on which UE's BPL loss indication was communicated.

Figure 13:
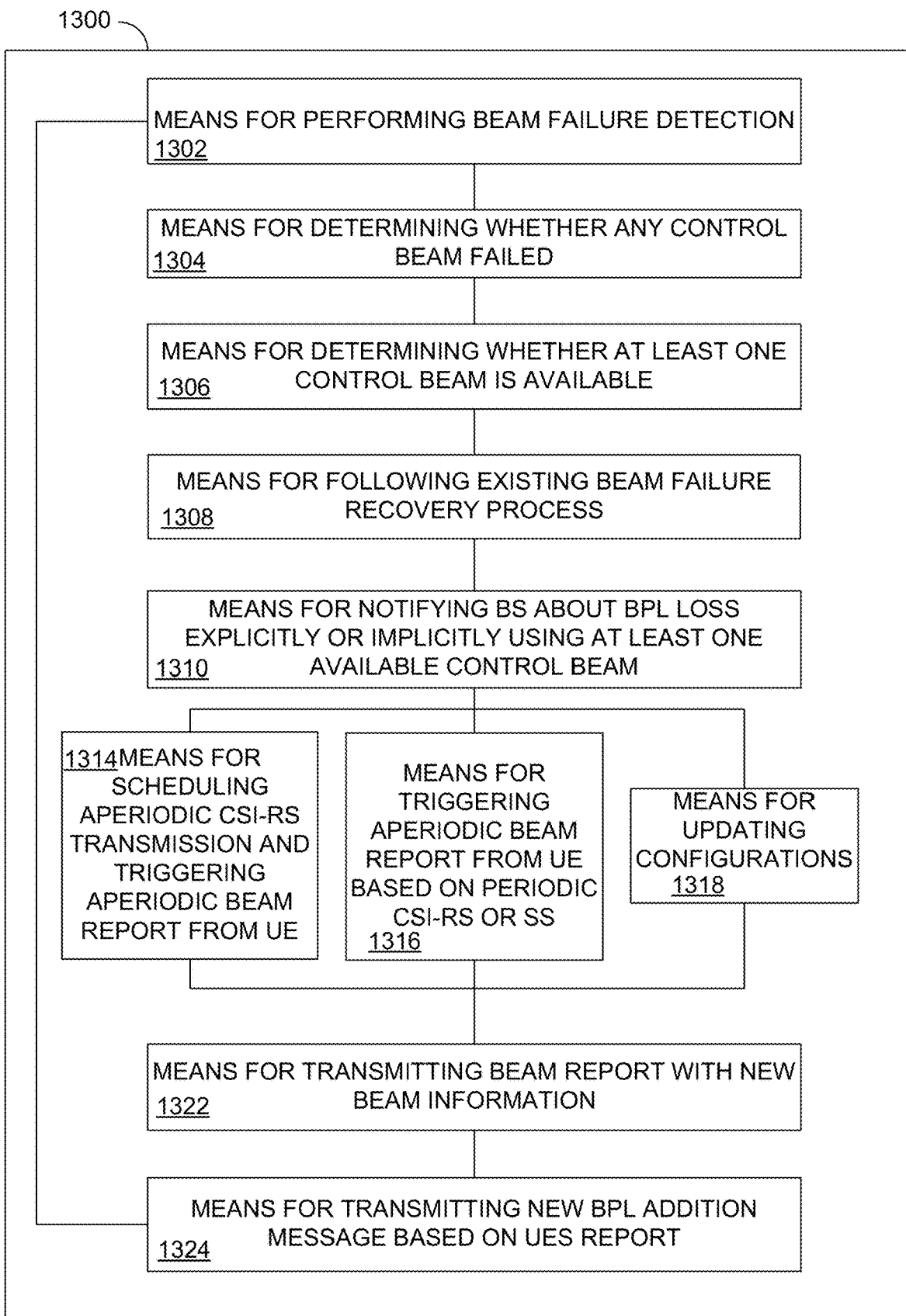
FIG. 13 is a functional block diagram of an apparatus for a communication system in accordance with various aspects of the present disclosure.

FIG. 13 is a functional block diagram of an apparatus 1300 for a communication system in accordance with various aspects of the present disclosure. The apparatus 1300 comprises means 1302 for performing beam failure detection. In certain embodiments, the means 1302 for performing beam failure detection can be configured to perform one or more of the function described in operation block 1202 of method 1200 (FIG. 12). In an exemplary embodiment, the means 1302 for performing beam failure detection may comprise the UE 650 performing beam failure detection using, for example, the controller/processor 659, memory 660, RX processor 656, receiver 654, and related circuitry (FIG. 6).

The apparatus 1300 further comprises means 1304 for determining whether any communication control beams have failed. In certain embodiments, the means 1304 for determining whether any communication control beams have failed can be configured to perform one or more of the function described in operation block 1204 of method 1200 (FIG. 12). In an exemplary embodiment, the means 1304 for determining whether any communication control beams have failed may comprise the UE 650 performing beam failure detection using, for example, the controller/processor 659, memory 660, RX processor 656, receiver 654, and related circuitry (FIG. 6).

The apparatus 1300 further comprises means 1306 for determining whether at least one communication control beam is available. In certain embodiments, the means 1306 for determining whether at least one communication control beam is available can be configured to perform one or more of the function described in operation block 1206 of method 1200 (FIG. 12). In an exemplary embodiment, the means 1306 for determining whether at least one communication control beam is available may comprise the UE 650 determining which control beam may be available using, for example, the controller/processor 659, memory 660, RX processor 656, receiver 654, and related circuitry (FIG. 6).

The apparatus 1300 further comprises means 1308 for following existing beam failure recovery procedures. In certain embodiments, the means 1308 for following existing beam failure recovery procedures can be configured to perform one or more of the function described in operation block 1208 of method 1200 (FIG. 12). In an exemplary embodiment, the means 1308 for following existing beam failure recovery procedures may comprise the UE 650 following existing beam failure recovery procedures using, for example, the controller/processor 659, memory 660, RX processor 656, receiver 654, and related circuitry (FIG. 6).

The apparatus 1300 further comprises means 1310 for notifying a base station about BPL loss explicitly or implicitly using at least one available control beam. In certain embodiments, the means 1310 for notifying a base station about BPL loss explicitly or implicitly using at least one available control beam can be configured to perform one or more of the function described in operation block 1210 of method 1200 (FIG. 12). In an exemplary embodiment, the means 1310 for notifying a base station about BPL loss explicitly or implicitly using at least one available control beam may comprise the UE 650 communicating the partial BPL loss to the base station over an existing control beam using, for example, the controller/processor 659, memory 660, RX processor 656, receiver 654, TX processor 668, transmitter 654, and related circuitry (FIG. 6).

The apparatus 1300 further comprises means 1314 for scheduling an aperiodic CSI-RS transmission and triggering an aperiodic beam status report from a UE. In certain embodiments, the means 1314 for scheduling an aperiodic CSI-RS transmission and triggering an aperiodic beam status report from a UE can be configured to perform one or more of the function described in operation block 1214 of method 1200 (FIG. 12). In an exemplary embodiment, the means 1314 for scheduling an aperiodic CSI-RS transmission and triggering an aperiodic beam status report from a UE may comprise the base station 610 scheduling an aperiodic CSI-RS transmission, using, for example, the controller/processor 675, memory 676, TX processor 616, transmitter 618, and related circuitry (FIG. 6).

The apparatus 1300 further comprises means 1316 for triggering an aperiodic beam status report from a UE based on a periodic CSI-RS or SS. In certain embodiments, the means 1316 for triggering an aperiodic beam status report from a UE based on a periodic CSI-RS or SS can be configured to perform one or more of the function described in operation block 1216 of method 1200 (FIG. 12). In an exemplary embodiment, the means 1316 for triggering an aperiodic beam status report from a UE based on a periodic CSI-RS or SS may comprise the base station 610 triggering an aperiodic beam status report from the UE using a periodic CSI-RS or SS transmission, using, for example, the controller/processor 675, memory 676, TX processor 616, transmitter 618, and related circuitry (FIG. 6).

The apparatus 1300 further comprises means 1318 for updating configurations. In certain embodiments, the means 1318 for updating configurations can be configured to perform one or more of the function described in operation block 1218 of method 1200 (FIG. 12). In an exemplary embodiment, the means 1318 for updating configurations may comprise the base station 610 updating one or more configurations, using, for example, the controller/processor 675, memory 676, TX processor 616, transmitter 618, the controller/processor 659, memory 660, TX processor 668, transmitter 654, and related circuitry (FIG. 6).

The apparatus 1300 further comprises means 1322 for transmitting a beam status report with new beam information. In certain embodiments, the means 1322 for transmitting a beam report with new beam information can be configured to perform one or more of the function described in operation block 1222 of method 1200 (FIG. 12). In an exemplary embodiment, the means 1322 for transmitting a beam status report with new beam information may comprise the UE 650, after receiving either the aperiodic CSI-RS transmission (block 1314) from the base station, or the request for the aperiodic beam report based on a periodic CSI-RS signal or a periodic SS signal (block 1316) from the base station, transmitting a beam report with new beam information to the base station using, for example, the controller/processor 659, memory 660, RX processor 656, receiver 654, and related circuitry (FIG. 6).

The apparatus 1300 further comprises means 1324 for transmitting a new BPL addition message based on the UEs beam status report. In certain embodiments, the means 1324 for transmitting a new BPL addition message based on the UEs beam status report can be configured to perform one or more of the function described in operation block 1224 of method 1200 (FIG. 12). In an exemplary embodiment, the means 1324 for transmitting a new BPL addition message based on the UEs beam status report may comprise the base station 610 sending the new BPL information to the UE using, for example, the controller/processor 675, memory 676, TX processor 616, transmitter 618, the controller/processor 659, memory 660, TX processor 668, transmitter 654, and related circuitry (FIG. 6).

In an exemplary embodiment, for an access network, multiple control links can come from different cells or base stations. For example, a UE can have multiple links through different technologies, e.g. carrier aggregation (CA), dual connectivity, etc. For integrated access and backhaul, a backhaul node can connect with multiple nodes to improve the robustness of the communication channel. For partial BPL loss that occurs in a multiple node environment, a node with a good link can assist the node with a failing link for beam recovery.

Figure 14:
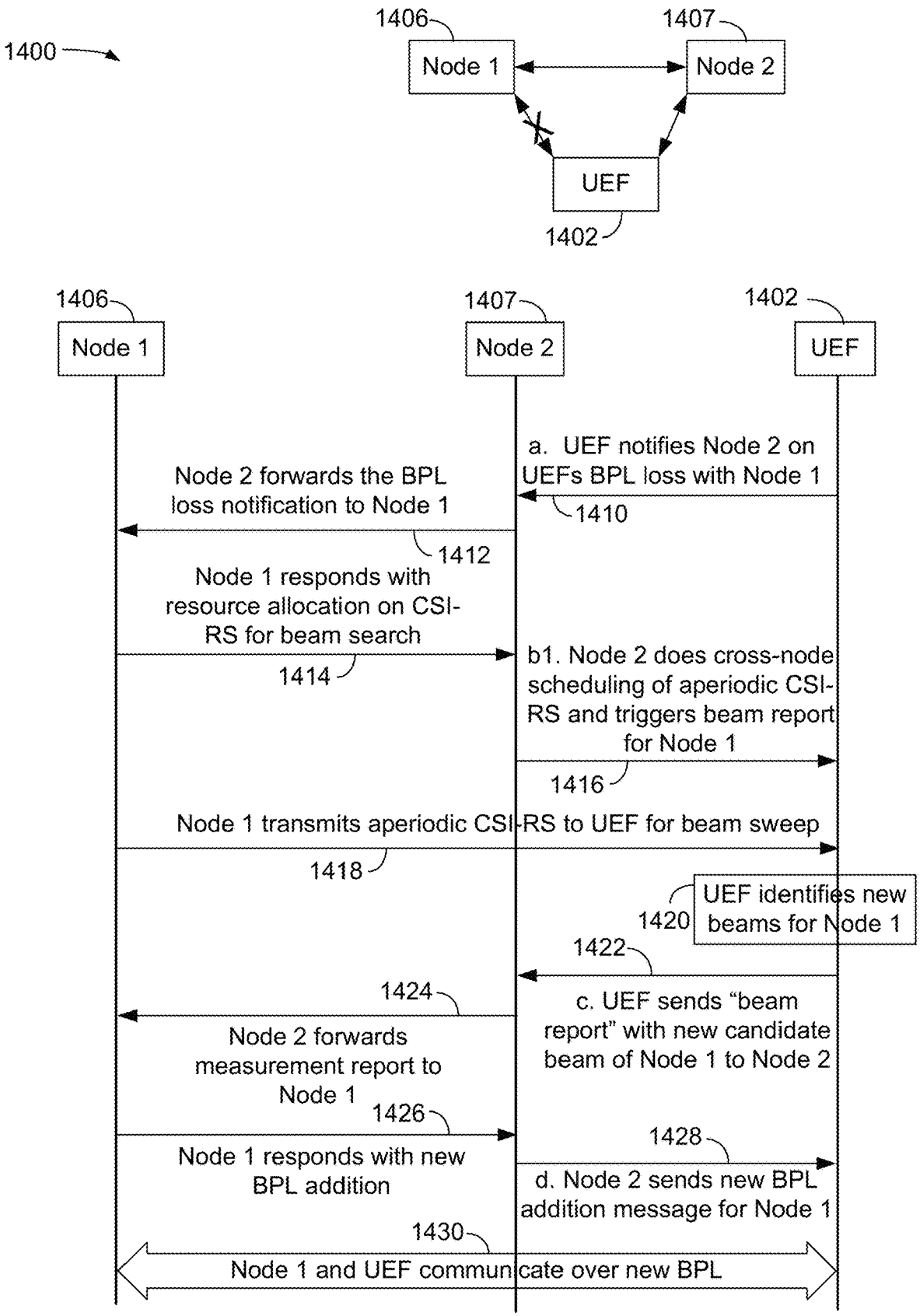
FIG. 14 is a call flow diagram for a communication system in accordance with various aspects of the present disclosure.

FIG. 14 is a call flow diagram 1400 for a communication system in accordance with various aspects of the present disclosure. The call flow diagram 1400 shows a UE 1402, referred to as a UEF, which may refer to a UE associated with an access network, or with a backhaul network. A first node, Node 1 1406 may be coupled to the UEF 1402 and to a second node, Node 2 1407. As shown in FIG. 14, the communication link between the UEF 1402 and the Node 1 1406 has failed. The first node, Node 1 1406 and the second node, Node 2 1407 may be communication devices, such as for example, base stations, or other communication devices.

In this exemplary embodiment, the node (Node 2 1407) with the good communication link assists the node (Node 1 1406) with the failing link for beam recovery.

In call 1410, the UEF 1402 notifies Node 2 1407 on the UEFs BPL loss with Node 1 1406.

In call 1412, Node 2 1407 forwards the BPL loss notification to Node 1 1406.

In call 1414, Node 1 1406 responds to Node 2 1407 with a resource allocation on a CSI-RS communication for beam search.

In call 1416, Node 2 1407 performs cross-node scheduling of an aperiodic CSI-RS and triggers a beam status report for Node 1 1406.

In call 1418, Node 1 1406 transmits an aperiodic CSI-RS transmission to the UEF 1402 to perform a beam sweep.

In process 1420, the UEF 1402 identifies candidate communication beams for Node 1 1406.

In call 1422, the UEF 1402 sends a beam status report with the candidate beams for Node 1 1406 to Node 2 1407.

In call 1424, Node 2 1407 forwards the beam report to Node 1 1406.

In call 1426, Node 1 1406 responds to Node 2 1407 with a new BPL addition communication.

In call 1428, Node 2 1407 sends the new BPL addition message for Node 1 1406 to the UEF 1402.

In call 1430, the UEF 1402 and the Node 1 1406 now communicate over the newly added BPL.

As shown in FIG. 14, the steps 1210, 1214, 1222 and 1224 (alternative 1) of FIG. 12 are done between the UEF 1402 and Node 2 1407 of the good link to help establish the new link between the UEF 1402 and Node 1 1406. In this exemplary embodiment, the node (Node 2 1407) with the good link supports reception and transmission of messages with the UEF 1402 for the node (Node 1 1406) with the failing link. The node with the good link exchanges information with the node of failing link for beam recovery.

Figure 15:
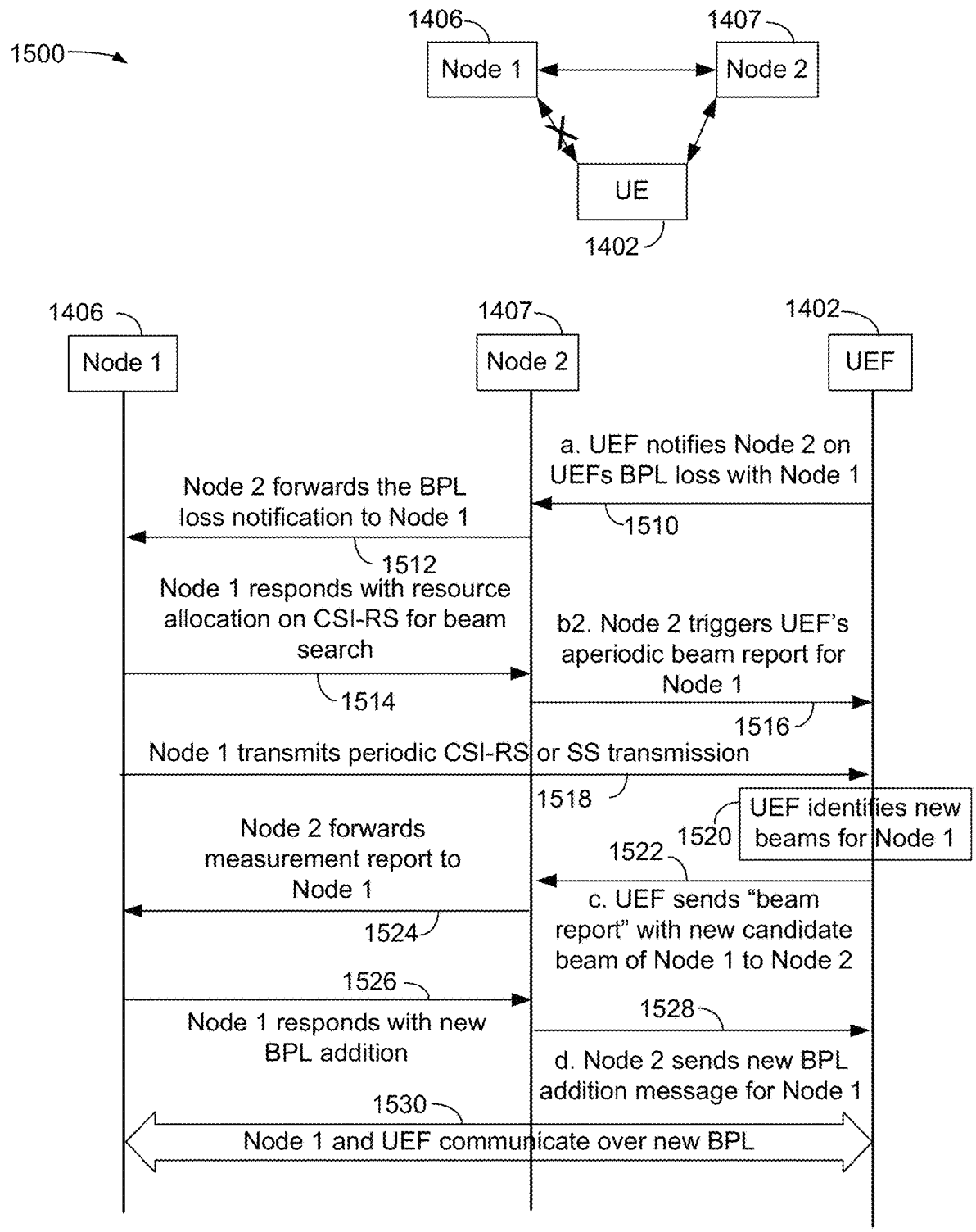
FIG. 15 is a call flow diagram for a communication system in accordance with various aspects of the present disclosure.

FIG. 15 is a call flow diagram 1500 for a communication system in accordance with various aspects of the present disclosure. The call flow diagram 1500 shows the UEF 1402, the first node, Node 1 1406, and the second node, Node 2 1407. As shown in FIG. 15, the communication link between the UEF 1402 and the Node 1 1406 has failed.

In this exemplary embodiment, the node (Node 2 1407) with the good communication link assists the node (Node 1 1406) with the failing link for beam recovery.

In call 1510, the UEF 1402 notifies Node 2 1407 on the UEFs BPL loss with Node 1 1406.

In call 1512, Node 2 1407 forwards the BPL loss notification to Node 1 1406.

In call 1514, Node 1 1406 responds to Node 2 1407 with a resource allocation on a CSI-RS communication for beam search.

In call 1516, Node 2 1407 triggers the UEF 1402 to generate an aperiodic beam status report for Node 1 1406.

In call 1518, Node 1 1406 transmits a periodic CSI-RS transmission or SS transmission to UEF to perform a beam sweep.

In process 1520, the UEF 1402 identifies candidate communication beams for Node 1 1406.

In call 1522, the UEF 1402 sends a beam status report with the candidate beams for Node 1 1406 to Node 2 1407.

In call 1524, Node 2 1407 forwards the beam status report to Node 1 1406.

In call 1526, Node 1 1406 responds to Node 2 1407 with a new BPL addition communication.

In call 1528, Node 2 1407 sends the new BPL addition message for Node 1 1406 to the UEF 1402.

In call 1530, the UEF 1402 and the Node 1 1406 now communicate over the newly added BPL.

As shown in FIG. 15, the steps 1210, 1216, 1222 and 1224 (alternative 2) of FIG. 12 are done similarly to that shown in FIG. 14, except that in FIG. 15, the node (Node 2 1407) with the good link does not perform cross-node scheduling of an aperiodic CSI-RS transmission.

Figure 16:
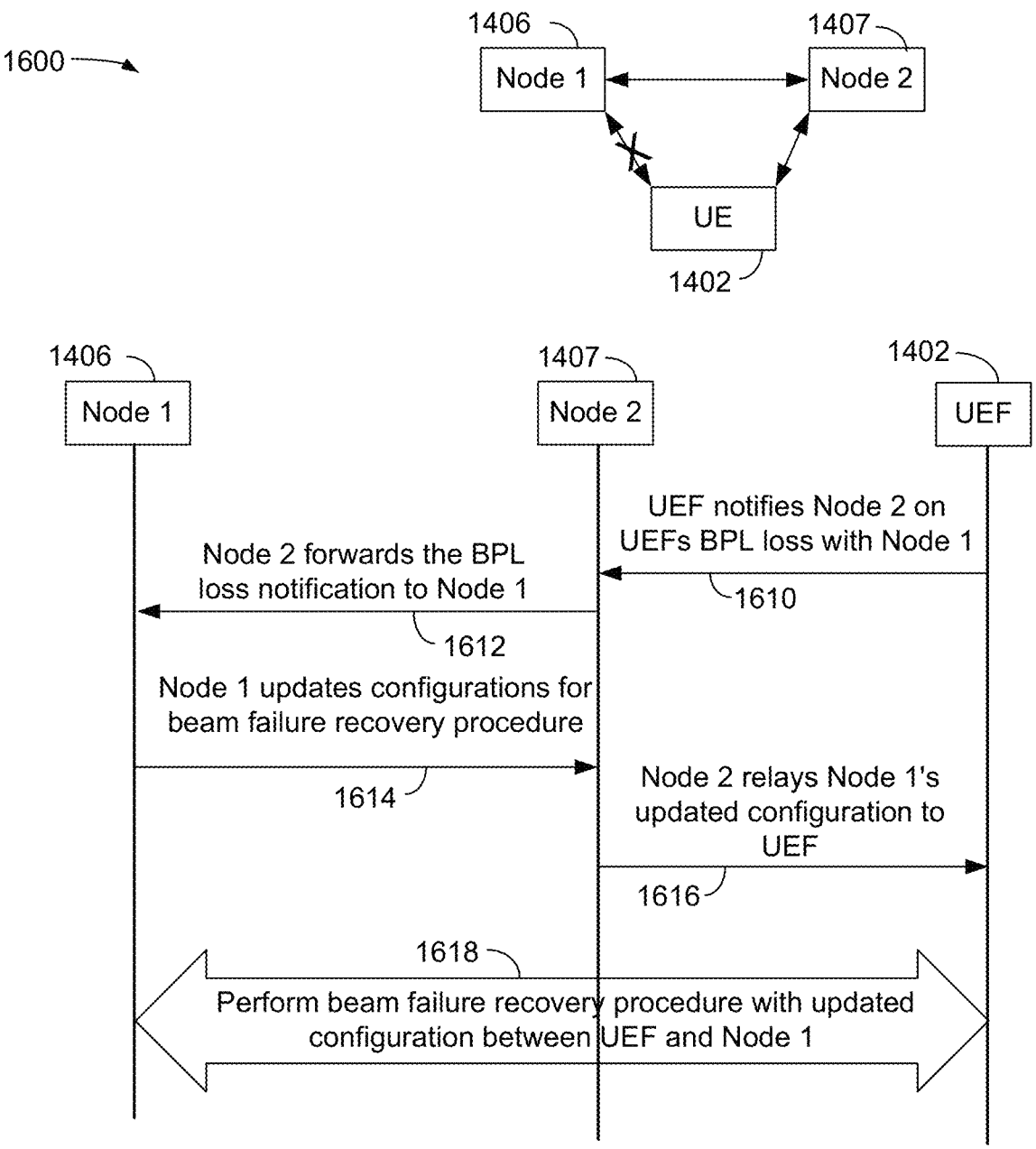
FIG. 16 is a call flow diagram for a communication system in accordance with various aspects of the present disclosure.

FIG. 16 is a call flow diagram 1600 for a communication system in accordance with various aspects of the present disclosure. The call flow diagram 1600 shows the UEF 1402, the first node, Node 1 1406, and the second node, Node 2 1407. As shown in FIG. 16, the communication link between the UEF 1402 and the Node 1 1406 has failed.

In this exemplary embodiment, the node (Node 2 1407) with the good communication link assists the node (Node 1 1406) with the failing link for beam recovery.

In call 1610, the UEF 1402 notifies Node 2 1407 on the UEFs BPL loss with Node 1 1406.

In call 1612, Node 2 1407 forwards the BPL loss notification to Node 1 1406.

In call 1614, Node 1 1406 updates configurations for beam failure recovery procedure.

In call 1616, Node 2 1407 relays Node 1's 1406 updated configuration to the UEF 1402.

In call 1618, the UEF 1402 and the Node 1 1406 perform beam failure recovery in accordance with the updated configuration.

As shown in FIG. 16, the steps 1210, 1218, 1222 and 1224 (alternative 3) of FIG. 12 are performed such that the node (Node 2 1407) with good link assists the node (Node 1 1406) with the failing link by forwarding the loss indication from the UEF 1402 and relaying updated configurations to the UEF 1402. There is no cross-node scheduling and there is less coordination and less delay between the node (Node 2 1407) with good link and the node (Node 1 1406) with the failing link.

Figure 17:
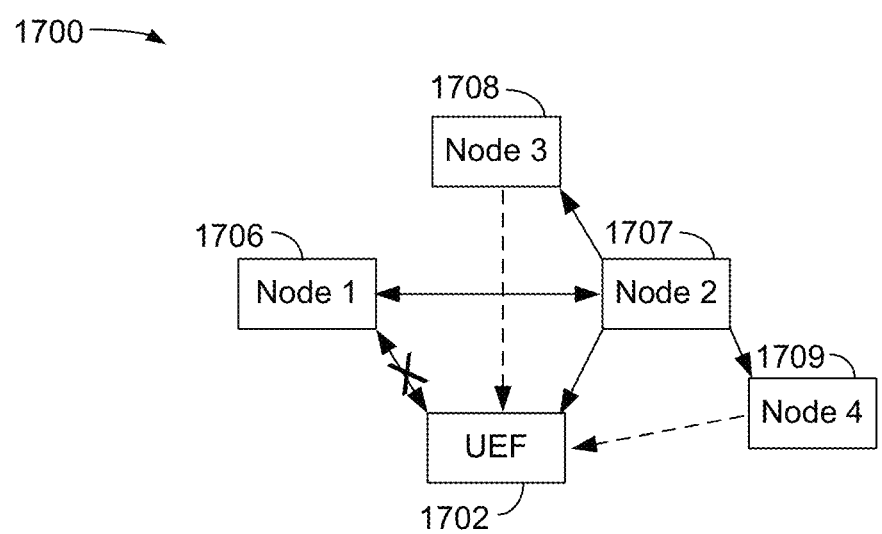
FIG. 17 is a diagram for a communication system in accordance with various aspects of the present disclosure.

FIG. 17 is a diagram for a communication system 1700 in accordance with various aspects of the present disclosure. The communication system 1700 shows a UEF 1702, a Node 1 1706, a Node 2 1707, a Node 3 1708 and a Node 4 1709. In this example, a node with good link may also contact other backup nodes that may be in a power saving mode to get involved in beam failure recovery procedure. For example, upon reception of BPL loss indication between the UEF 1702 and Node 1 1706, the Node2 1707 may wake up a backup Node 3 1708 and Node 4 1709, and request them to transmit SS signals more frequently, so that the UEF 1702 has more opportunities to identify a candidate beam.

Figure 18:
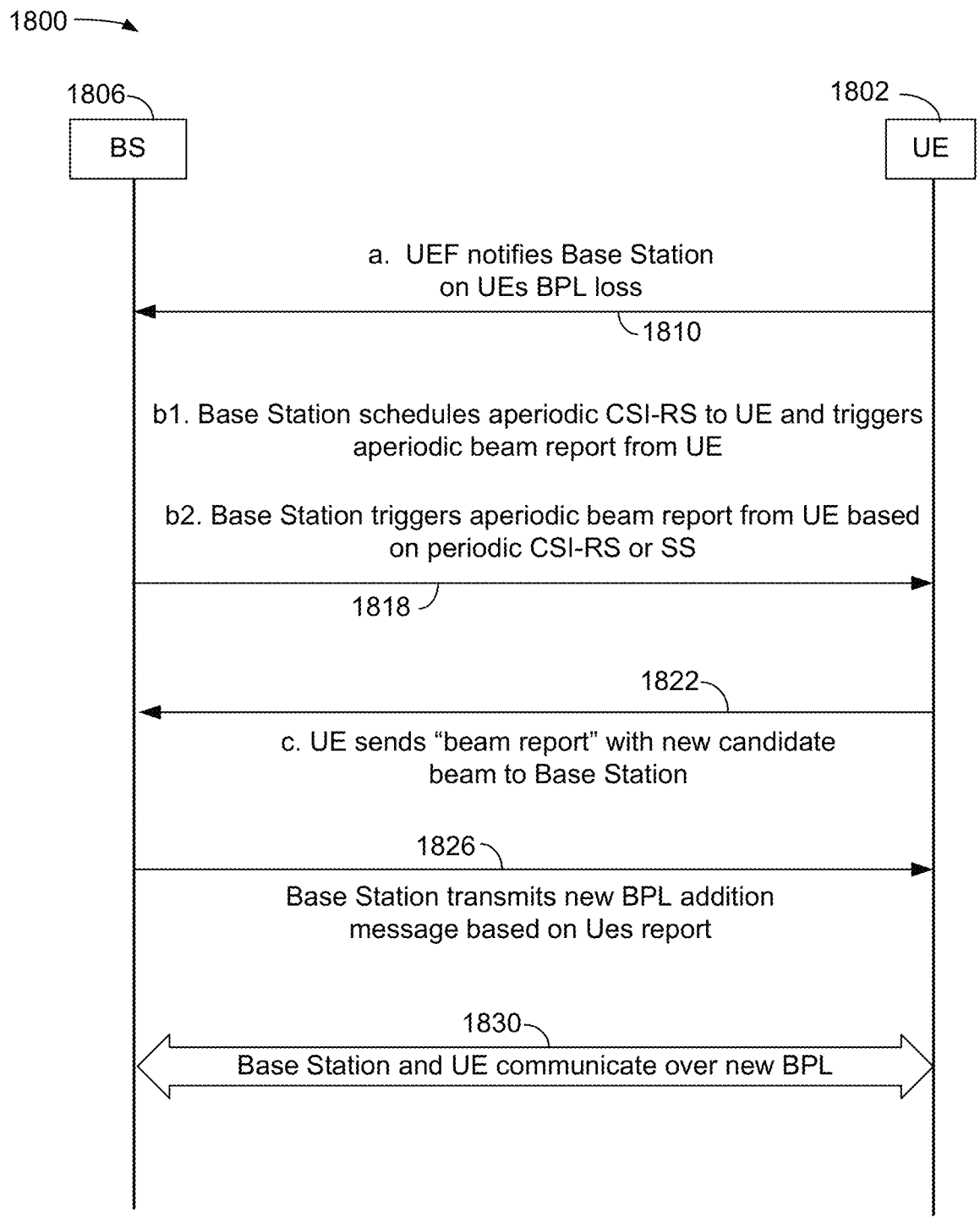
FIG. 18 is a call flow diagram for a communication system in accordance with various aspects of the present disclosure.

FIG. 18 is a call flow diagram 1800 for a communication system in accordance with various aspects of the present disclosure. The call flow diagram 1800 shows a UE 1802 communicating with a base station 1806.

In call 1810, the UE 1802 notifies the base station 1806 of the UEs BPL loss with the base station 1806.

In call 1818, the base station may schedule an aperiodic CSI-RS to the UE and trigger an aperiodic beam report from the UE. Alternatively, the base station may trigger an aperiodic beam report from the UE based on a periodic CSI-RS or SS.

In call 1822, the UE 1802 sends a beam status report with the candidate beams to the base station 1806.

In call 1826, the base station sends a new BPL addition message to the UE 1802.

In call 1830, the UE 1802 and the base station 1806 now communicate over the newly added BPL.

In an exemplary embodiment, the partial BPL loss recovery uses the at least one good control BPL for the UE to communicate with the base station. Using this good control BPL, aperiodic CSI-RS can be triggered for the UE to search for new candidate beams immediately after BPL loss detection without the need to wait for the next periodic CSI-RS or SS opportunity.

In an exemplary embodiment, for partial BPL loss recovery, the recovery request message can be sent through the good BPL in, for example, a PUCCH communication, and the network only need reserve the number of uplink (UL) resources that correspond to the number of serving control beams.

It is desirable to handle the partial BPL loss in the existing framework of beam management as much as possible. The existing framework for beam management defines procedures for beam determination, beam measurement, beam reporting, and beam sweeping, but all these procedures are triggered and controlled by the network.

In an exemplary embodiment, a UE initiated request message may be defined in Layer 1 or Layer 2 to notify a base station about partial BPL loss explicitly or implicitly and to request further beam management procedures immediately after the UE's partial BPL loss detection.

In an exemplary embodiment, a base station operating in the 5G or NR environment may support a UE initiated request message in Layer 1 or Layer 2 for the UE to notify the base station about partial BPL loss explicitly or implicitly and to request further beam management steps. For the case of partial BPL loss, the UE may transmit the partial BPL loss recovery request message using, for example, a PUCCH communication using the good BPL. The network may reserve the number of UL resources that correspond to the number of serving control beams, so that the UE can use one of resource that corresponds to the good BPL to transmit the request.

In an exemplary embodiment, a base station operating in the 5G or NR environment may reserve the number of UL resources that correspond to the number of serving control beams. The UE may transmit partial BPL loss recovery request message in, for example, a PUCCH communication using the UL resource corresponding to the good BPL. In LTE, only one request signal is defined in the PUCCH, which is scheduling request (SR) to request for UL grant. However, in 5G or NR with beam management, there could be different request types of requests in addition to SR, e.g. a request for partial BPL loss recovery, a beam refinement request, a beam failure recovery request over the PUCCH. A new PUCCH format may be designed to indicate different request types initiated by UE. Since the request message is triggered by a UE based on certain triggering conditions, to save UE power, the request message should be an on-off signal.

In an exemplary embodiment, a base station operating in the 5G or NR environment may support the design of a new on-off PUCCH format to indicate different request messages initiated by a UE, one of the request messages being related to recovery of partial BPL loss.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication, comprising:
    determining whether any of a plurality of communication control beams have failed;
    identifying at least one active communication control beam in the plurality of communication control beams;
    communicating a partial beam pair link (BPL) loss communication on the at least one active communication control beam; and
    in response to the partial beam pair link (BPL) loss communication on the at least one active communication control beam, determining whether a periodic channel state information-reference signal, CSI-RS, or periodic synchronization signal, SS, timing threshold is exceeded within which to receive a communication configured to trigger an aperiodic beam status report.

2. The method of claim 1, further comprising:
    upon receiving the partial beam pair link (BPL) loss communication, if a time to a next periodic channel state information-reference signal, CSI-RS, or periodic synchronization signal, SS, exceeds the timing threshold, scheduling the aperiodic channel state information-reference signal (CSI-RS) communication and triggering the aperiodic beam status report;
    transmitting the aperiodic beam status report with new beam information; and
    transmitting a new BPL addition message based on the aperiodic beam status report.

3. The method of claim 1, further comprising:
    upon receiving the partial beam pair link (BPL) loss communication, triggering an aperiodic beam status report where measurements are based on at least one of a periodic channel state information-reference signal (CSI-RS) communication and a periodic synchronization signal (SS) communication;
    transmitting the beam status report with new beam information; and
    transmitting a new BPL addition message based on the beam status report.

4. The method of claim 1, further comprising:
    upon receiving the partial beam pair link (BPL) loss communication, updating a base station configuration and following a beam failure recovery process.

5. The method of claim 1, wherein the partial beam pair link (BPL) loss communication on the at least one active communication control beam is sent using a physical uplink control channel (PUCCH) communication.

6. The method of claim 1, wherein the partial beam pair link (BPL) loss communication on the at least one active communication control beam is sent using an uplink (UL) medium access control (MAC) control element (CE) in a physical uplink shared channel (PUSCH) communication.

7. The method of claim 1, wherein the partial beam pair link (BPL) loss communication is sent to a communication device on a second node on behalf of a communication device on a first node, the communication device on the first node experiencing the partial beam pair link (BPL) loss.

8. The method of claim 7, wherein the communication device on the second node notifies the communication device on the first node of the partial beam pair link (BPL) loss.

9. A system for communication, comprising:
    a user equipment (UE) configured to determine whether any of a plurality of communication control beams have failed;
    the UE configured to identify at least one active communication control beam in the plurality of communication control beams;
    the UE configured to communicate a partial beam pair link (BPL) loss communication on the at least one active communication control beam; and
    in response to the partial beam pair link (BPL) loss communication on the at least one active communication control beam, the UE configured to determine whether a periodic channel state information-reference signal, CSI-RS, or periodic synchronization signal, SS, timing threshold is exceeded within which to receive a communication configured to trigger an aperiodic beam status report.

10. The system of claim 9, further comprising:
    upon receiving the partial beam pair link (BPL) loss communication, if a time to a next periodic channel state information-reference signal, CSI-RS, or periodic synchronization signal, SS, exceeds the timing threshold, a base station configured to schedule the aperiodic channel state information-reference signal (CSI-RS) communication and configured to trigger the aperiodic beam status report from a UE;
    the UE configured to transmit the aperiodic beam status report with new beam information to the base station; and
    the base station configured to transmit a new BPL addition message based on the aperiodic beam status report to the UE.

11. The system of claim 9, further comprising:
    upon receiving the partial beam pair link (BPL) loss communication, a base station configured to trigger an aperiodic beam status report from the UE where measurements are based on at least one of a periodic channel state information-reference signal (CSI-RS) communication and a periodic synchronization signal (SS) communication;
    the UE configured to transmit the beam status report with new beam information to the base station; and
    the base station configured to transmit a new BPL addition message based on the beam status report to the UE.

12. The system of claim 9, further comprising:
    upon receiving the partial beam pair link (BPL) loss communication, a base station configured to update the base station configuration and follow a beam failure recovery process.

13. The system of claim 9, wherein the partial beam pair link (BPL) loss communication on the at least one active communication control beam is sent using a physical uplink control channel (PUCCH) communication.

14. The system of claim 9, wherein the partial beam pair link (BPL) loss communication on the at least one active communication control beam is sent using an uplink (UL) medium access control (MAC) control element (CE) in a physical uplink shared channel (PUSCH) communication.

15. The system of claim 9, wherein the partial beam pair link (BPL) loss communication is sent to a communication device on a second node on behalf of a communication device on a first node, the communication device on the first node experiencing the partial beam pair link (BPL) loss.

16. The system of claim 15, wherein the communication device on the second node notifies the communication device on the first node of the partial beam pair link (BPL) loss with the UE.

17. A method for communication, comprising:
determining whether any of a plurality of communication control beams have failed;
identifying at least one active communication control beam in the plurality of communication control beams;
communicating a partial beam pair link (BPL) loss communication when a partial beam pair link (BPL) loss occurs between a first communication device and a first communication node, the partial beam pair link (BPL) loss communication occurring between the first communication device and a second communication node on behalf of the first communication node experiencing the partial beam pair link (BPL) loss with the first communication device; and
in response to the partial beam pair link (BPL) loss communication on the at least one active communication control beam, determining whether a periodic channel state information-reference signal, CSI-RS, or periodic synchronization signal, SS, timing threshold is exceeded within which to receive a communication configured to trigger an aperiodic beam status report.

18. The method of claim 17, further comprising:
upon receiving the partial beam pair link (BPL) loss communication, if a time to a next periodic channel state information-reference signal, CSI-RS, or periodic synchronization signal, SS, exceeds the timing threshold, scheduling the aperiodic channel state information-reference signal (CSI-RS) communication and triggering the aperiodic beam status report;
transmitting the aperiodic beam status report with new beam information; and
transmitting a new BPL addition message based on the aperiodic beam status report.

19. The method of claim 17, further comprising:
upon receiving the partial beam pair link (BPL) loss communication, triggering an aperiodic beam status report where measurements are based on at least one of a periodic channel state information-reference signal (CSI-RS) communication and a periodic synchronization signal (SS) communication;
transmitting the beam status report with new beam information; and
transmitting a new BPL addition message based on the beam status report.

20. The method of claim 17, further comprising:
upon receiving the partial beam pair link (BPL) loss communication, updating a base station configuration and following a beam failure recovery process.

21. The method of claim 17, further comprising sending the partial beam pair link (BPL) loss communication on the at least one active communication control beam using a physical uplink control channel (PUCCH) communication.

22. The method of claim 17, further comprising the partial beam pair link (BPL) loss communication on the at least one active communication control beam using an uplink (UL) medium access control (MAC) control element (CE) in a physical uplink shared channel (PUSCH) communication.

23. The method of claim 17, further comprising the second communication node notifying the first communication node of the partial beam pair link (BPL) loss.

24. A non-transitory computer-readable medium storing computer executable code for communication, the code executable by a processor to:
determine whether any of a plurality of communication control beams have failed;
identify at least one active communication control beam in the plurality of communication control beams;
communicate a partial beam pair link (BPL) loss communication on the at least one active communication control beam; and
in response to the partial beam pair link (BPL) loss communication on the at least one active communication control beam, determine whether a periodic channel state information-reference signal, CSI-RS, or periodic synchronization signal, SS, timing threshold is exceeded within which to receive a communication configured to trigger an aperiodic beam status report.

25. The non-transitory computer-readable medium of claim 24, the code executable by a processor to:
upon receiving the partial beam pair link (BPL) loss communication, if a time to a next periodic channel state information-reference signal, CSI-RS, or periodic synchronization signal, SS, exceeds the timing threshold, schedule the aperiodic channel state information-reference signal (CSI-RS) communication and trigger the aperiodic beam status report;
transmit the aperiodic beam status report with new beam information; and
transmit a new BPL addition message based on the aperiodic beam status report.

26. The non-transitory computer-readable medium of claim 24, wherein the code is executable by a processor to:
upon receiving the partial beam pair link (BPL) loss communication, trigger an aperiodic beam status report where measurements are based on at least one of a periodic channel state information-reference signal (CSI-RS) communication and a periodic synchronization signal (SS) communication;
transmit the beam status report with new beam information; and
transmit a new BPL addition message based on the beam status report.

27. The non-transitory computer-readable medium of claim 24, wherein the code is executable by a processor to: upon receiving the partial beam pair link (BPL) loss communication, update a base station configuration and follow a beam failure recovery process.

28. The non-transitory computer-readable medium of claim 24, wherein the code is executable by a processor to: send the partial beam pair link (BPL) loss communication on the at least one active communication control beam using a physical uplink control channel (PUCCH) communication.

29. The non-transitory computer-readable medium of claim 24, wherein the code is executable by a processor to: send the partial beam pair link (BPL) loss communication on the at least one active communication control beam using an uplink (UL) medium access control (MAC) control element (CE) in a physical uplink shared channel (PUSCH) communication.

30. The non-transitory computer-readable medium of claim 24, wherein the code is executable by a processor to: send the partial beam pair link (BPL) loss communication to a communication device on a second node on behalf of a communication device on a first node, the communication device on the first node experiencing the partial beam pair link (BPL) loss.

31. A method for communication, comprising:
determining whether any of a plurality of communication control beams have failed;
identifying at least one active communication control beam in the plurality of communication control beams;
communicating a partial beam pair link (BPL) loss communication on the at least one active communication control beam;
upon receiving the partial beam pair link (BPL) loss communication on the at least one active communication control beam, if a time to a next periodic channel state information-reference signal, CSI-RS, or periodic synchronization signal, SS, exceeds a timing threshold, scheduling an aperiodic channel state information-reference signal (CSI-RS) communication and triggering an aperiodic beam status report;
transmitting the aperiodic beam status report with new beam information; and
transmitting a new BPL addition message based on the aperiodic beam status report.

* * * * *